United States Patent
Bosecker et al.

(10) Patent No.: US 9,145,068 B2
(45) Date of Patent: Sep. 29, 2015

(54) SPINDLE GEAR UNIT HAVING REINFORCEMENT

(75) Inventors: Stefan Bosecker, Sonneberg (DE); Wolfgang Suck, Coburg (DE); Florian Lipp, Coburg (DE); Andrea Bauersachs, Ebersdorf (DE); Harald Bätz, Coburg (DE); Sven Fischer, Wohlbach (DE)

(73) Assignee: Brose Fahrzeugteile GmbH & Co. KG, Coburg, Coburg (DE)

( * ) Notice: Subject to any disclaimer, the term of this patent is extended or adjusted under 35 U.S.C. 154(b) by 459 days.

(21) Appl. No.: 13/578,448

(22) PCT Filed: Feb. 11, 2011

(86) PCT No.: PCT/EP2011/052027
§ 371 (c)(1),
(2), (4) Date: Aug. 30, 2012

(87) PCT Pub. No.: WO2011/098554
PCT Pub. Date: Aug. 18, 2011

(65) Prior Publication Data
US 2012/0325033 A1    Dec. 27, 2012

(30) Foreign Application Priority Data
Feb. 11, 2010    (DE) .......................... 10 2010 001 847

(51) Int. Cl.
*F16H 19/02* (2006.01)
*B60N 2/06* (2006.01)
*B60N 2/42* (2006.01)

(52) U.S. Cl.
CPC .............. *B60N 2/067* (2013.01); *B60N 2/4214* (2013.01); *Y10T 74/18576* (2015.01)

(58) Field of Classification Search
CPC .............................. B60N 2/4214; B60N 2/067
USPC ........................................ 74/89.23; 248/429
See application file for complete search history.

(56) References Cited

U.S. PATENT DOCUMENTS 5,823,499 A * 10/1998 Ito et al. .................. 248/429
7,051,986 B1 * 5/2006 Taubmann et al. ......... 248/429
(Continued)

FOREIGN PATENT DOCUMENTS

DE    199 42 973 A1    3/2001
DE    103 37 475 A1    3/2005
(Continued)

OTHER PUBLICATIONS

English translation of the International Preliminary Report on Patentability, corresponding to PCT/EP2011/052027, dated Aug. 14, 2012, 10 pages.
(Continued)

*Primary Examiner* — David M Fenstermacher
(74) *Attorney, Agent, or Firm* — Christie, Parker & Hale, LLP

(57) ABSTRACT

An adjusting means for adjusting two vehicle parts relative to each other, in particular for the longitudinal setting of a vehicle seat is provided. The adjusting means comprising an adjusting gear unit arranged on a first vehicle part and a spindle arranged on a second vehicle part, which extends in longitudinal direction, is in engagement with the adjusting gear unit and along which the adjusting gear unit is movable for adjusting the first vehicle part relative to the second vehicle part. There is provided a reinforcement part which supports the adjusting gear unit with respect to the first vehicle part in the longitudinal direction of the spindle such that due to the reinforcement part with forces introduced in the longitudinal direction from the first vehicle part into the adjusting gear unit the adjusting gear unit is supported with respect to the first vehicle part with a higher rigidity than with forces introduced against the longitudinal direction.

20 Claims, 23 Drawing Sheets

(56) References Cited

U.S. PATENT DOCUMENTS

| | | | |
|---|---|---|---|
| 7,143,513 B2* | 12/2006 | Taubmann et al. | 29/893.1 |
| 7,267,025 B2* | 9/2007 | Ko et al. | 74/493 |
| 7,278,331 B2* | 10/2007 | Wagner et al. | 74/89.23 |
| 7,340,974 B2* | 3/2008 | Landskron et al. | 74/425 |
| 7,437,962 B2* | 10/2008 | Taubmann et al. | 74/89.1 |
| 7,571,666 B2* | 8/2009 | Borbe et al. | 74/606 R |
| 7,658,125 B2* | 2/2010 | Inayoshi et al. | 74/493 |
| 7,703,347 B2* | 4/2010 | Porinsky et al. | 74/441 |
| 7,775,131 B2* | 8/2010 | Becker et al. | 74/89.23 |
| 8,256,317 B2* | 9/2012 | Koga et al. | 74/425 |
| 8,256,822 B2* | 9/2012 | Koga et al. | 296/65.15 |
| 8,770,063 B2* | 7/2014 | Bhatti | 74/606 R |
| 8,864,231 B2* | 10/2014 | Shimoda et al. | 297/311 |

FOREIGN PATENT DOCUMENTS

| | | |
|---|---|---|
| DE | 103 53 245 A1 | 6/2005 |
| DE | 10 2006 049 807 A1 | 4/2008 |
| DE | 10 2006 049 809 A1 | 4/2008 |
| DE | 20 2007 011 851 U1 | 2/2009 |
| DE | 10 2007 059 744 A1 | 6/2009 |
| EP | 0 759 374 A2 | 2/1997 |
| EP | 2 070 761 A2 | 6/2009 |
| EP | 2 070 761 A3 | 6/2009 |

OTHER PUBLICATIONS

International Search Report of corresponding PCT/EP2011/052027, dated Jul. 4, 2011, 4 pages.

* cited by examiner

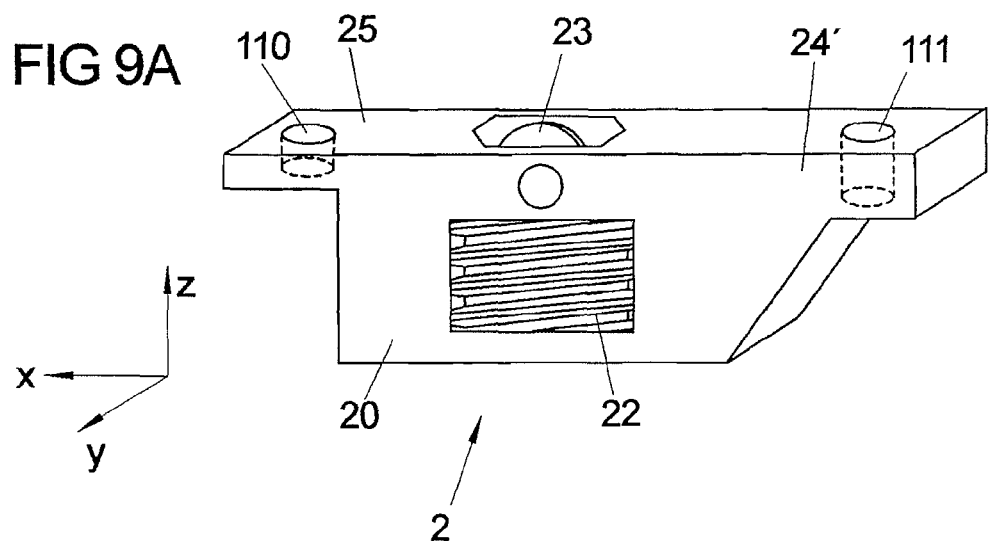
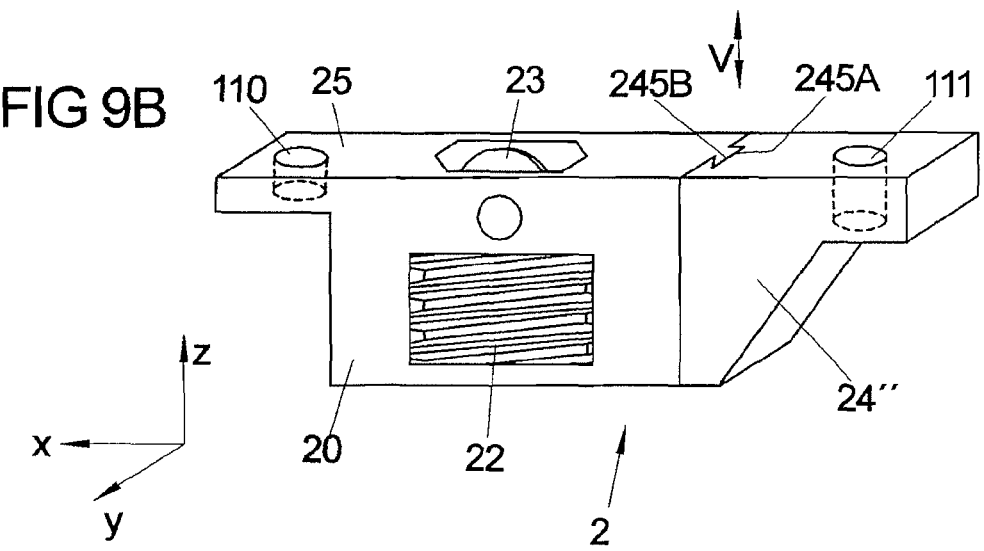
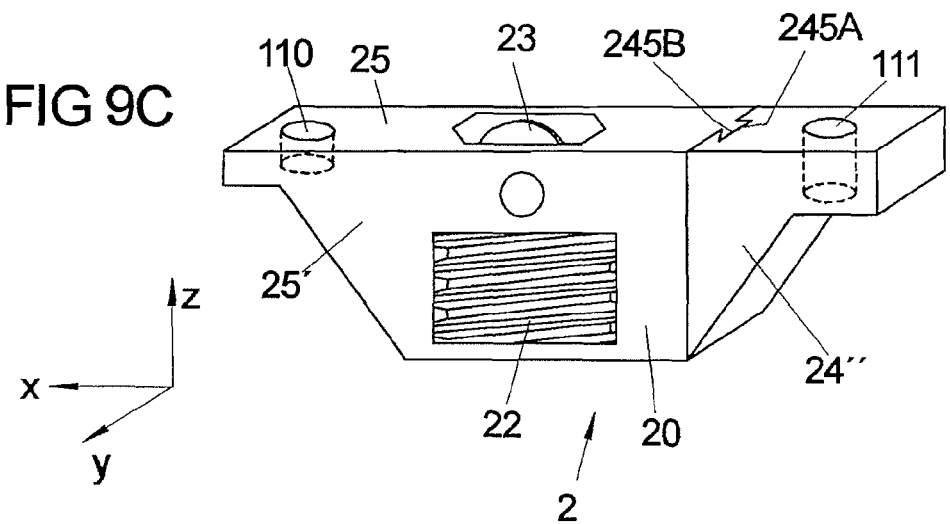

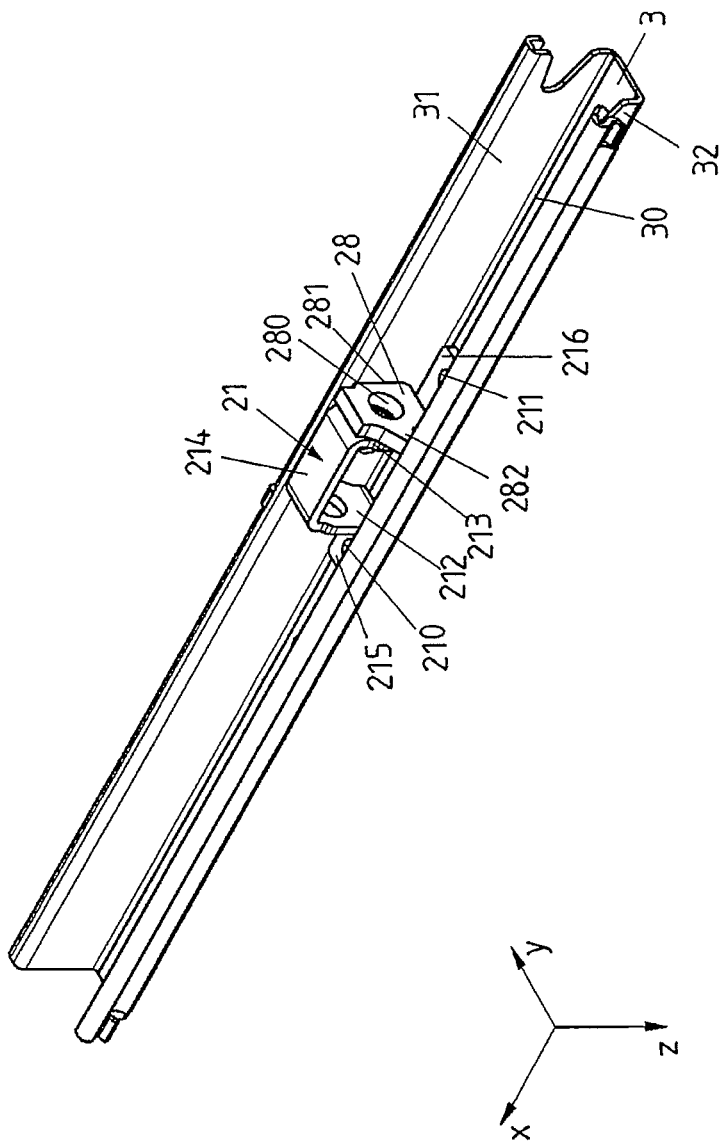

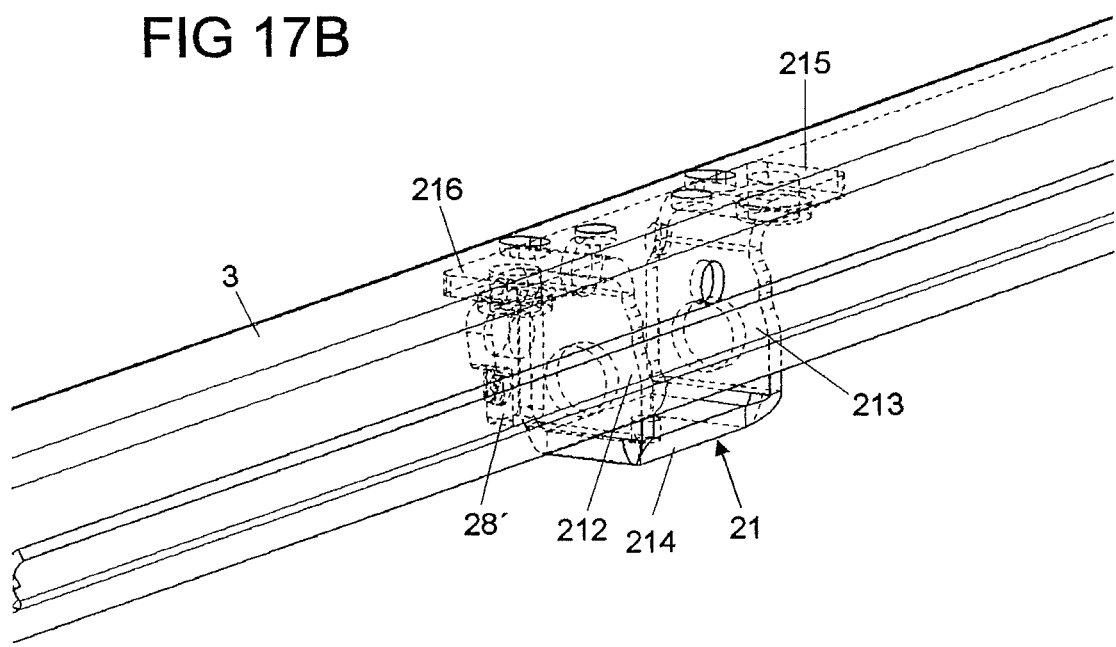
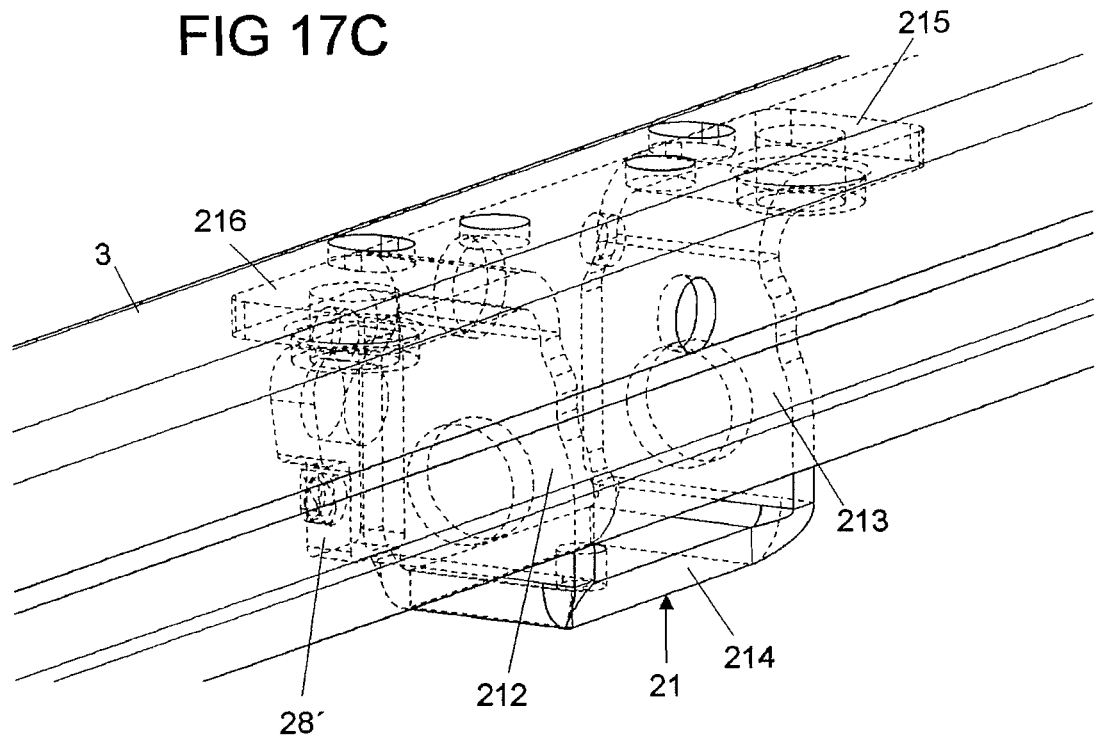

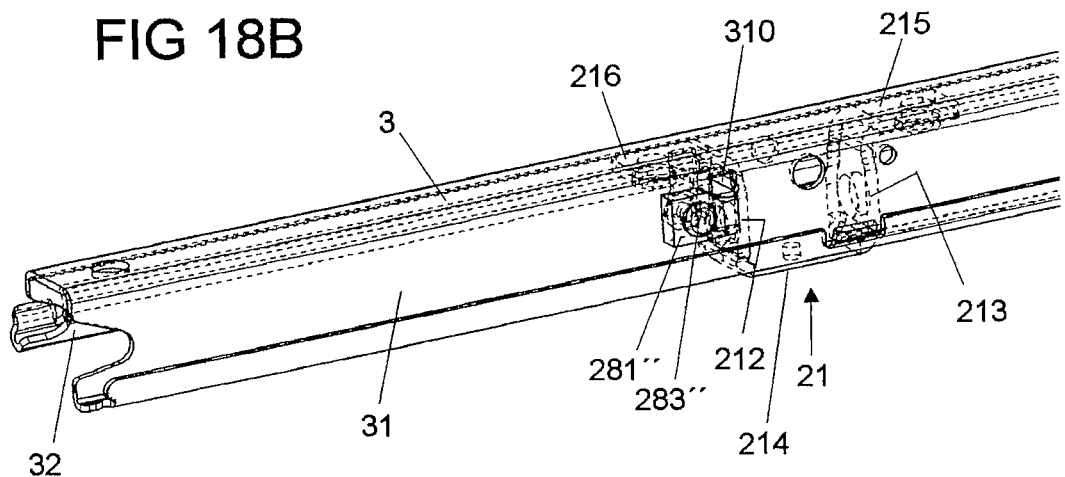
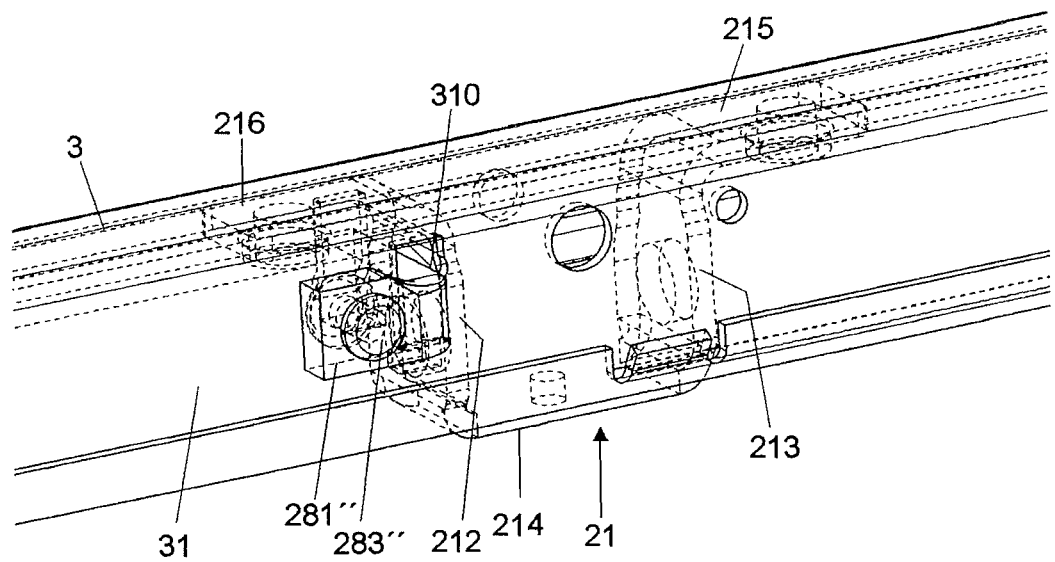

SPINDLE GEAR UNIT HAVING REINFORCEMENT

CROSS-REFERENCE TO A RELATED APPLICATION

This application is a National Phase Patent Application of International Patent Application Number PCT/EP2011/052027, filed on Feb. 11, 2011, which claims priority of German Patent Application Number 10 2010 001 847.3, filed on Feb. 11, 2010.

BACKGROUND

This invention relates to an adjusting means for adjusting two vehicle parts relative to each other, in particular for the longitudinal setting of a vehicle seat.

Such adjusting means forming a spindle gear unit includes an adjusting gear unit arranged on a first vehicle part and a spindle extending in longitudinal direction, which is arranged on a second vehicle part. The adjusting gear unit and the spindle realize a spindle gear unit, in that the spindle is in engagement with the adjusting gear unit and the adjusting gear unit can be moved along the spindle for adjusting the first vehicle part relative to the second vehicle part.

Such adjusting means in particular can be used for the longitudinal setting of a vehicle seat, in that the adjusting gear unit for example is arranged on a first, seat-side guide rail and the spindle is arranged on a second, body-mounted guide rail, wherein the adjusting gear unit for example includes a spindle nut which is driven for the longitudinal setting of the vehicle seat and thereby rolls on the spindle, so as to adjust the first guide rail along the second guide rail.

In an adjusting means known from DE 103 37 475 A1, an adjusting gear unit, which is in engagement with a stationary spindle via a spindle nut, is fixed on a guide rail of a vehicle seat via a holding bracket. The holding bracket forming a U-section encloses the adjusting gear unit and can be attached to the guide rail via fastening points. By shifting the adjusting gear unit along the spindle stationarily arranged on a further guide rail, the vehicle seat then can be set in its longitudinal position.

In such adjusting means, the connection of the vehicle parts to be adjusted is effected via the adjusting gear unit and in particular its engagement with the associated spindle. Correspondingly, the adjusting gear unit and in particular also its connection to the associated (first) vehicle part must be designed such that the same can withstand high loads, for example in a crash, in order to provide a safe, crash-resistant connection of the vehicle parts with each other. On the one hand, the connection of the adjusting gear unit must be formed sufficiently rigid to absorb the forces. On the other hand, too rigid connections in turn, however, also have the disadvantage that for example in a rear-end crash forces are introduced onto a seat occupant in a rigid way and can lead to injuries, for example to a whiplash injury as a result of a sudden rearward displacement.

SUMMARY

It is the object underlying the present invention to provide an adjusting means as mentioned above, which in a simple way and without a fundamental change of the functional construction of such adjusting means provides for an advantageous connection of the adjusting gear unit to an associated vehicle part.

According to an exemplary embodiment of the invention is provided a reinforcement part which supports the adjusting gear unit with respect to the first vehicle part in the longitudinal direction of the spindle such that with forces introduced in the longitudinal direction from the first vehicle part into the adjusting gear unit the adjusting gear unit is supported with respect to the first vehicle part with a higher rigidity than with forces introduced against the longitudinal direction, due to the reinforcement part.

For example, it can be provided that the reinforcement part unilaterally supports the adjusting gear unit, in that it supports the adjusting gear unit with respect to forces acting in the longitudinal direction, which were introduced from the first vehicle part into the adjusting gear unit, but not with respect to forces acting against the longitudinal direction. For this purpose, the reinforcement part can be arranged behind the adjusting gear unit in longitudinal direction of the spindle, for example when the adjusting means serves the longitudinal setting of a vehicle seat, (with the longitudinal direction of the spindle corresponding to a longitudinal vehicle direction directed in direction of the forward travel of a vehicle), in order to support the forces which in a frontal crash are introduced into the adjusting gear unit due to the inertia of the vehicle seat and a vehicle occupant.

In the sense of the present invention a reinforcement part is provided, which unilaterally supports the adjusting gear unit and acts between the adjusting gear unit and for example a guide rail on which the adjusting gear unit is arranged. The reinforcement part is formed to absorb and support forces in the longitudinal direction of the spindle, so that when a force acts in the longitudinal direction of the spindle, the adjusting gear unit is rigidly supported with respect to the associated vehicle part. The reinforcement part can be formed such that when a force acts in the longitudinal direction, it is loaded and ensures a rigid connection of the adjusting gear unit, but is not loaded with an opposite action of force against the longitudinal direction and does not stiffen the connection of the adjusting gear unit to the associated vehicle part, for example the guide rail. In this way, it can be achieved that for example in a frontal crash the adjusting gear unit is rigidly connected to the guide rail and cannot be deformed, whereas in a rear-end crash, i.e. when a force acts in the opposite direction, the connection of the adjusting gear unit to the associated vehicle part has a lower rigidity and a deformation of the adjusting gear unit and/or its connection is permitted, which leads to a predetermined maximum offset between the vehicle parts connected via the adjusting gear unit and the spindle. In this way, a vehicle seat can be held with a high rigidity in a frontal crash, whereas in a rear-end crash a certain offset of the vehicle seat becomes possible by deformation in the sense of a crumple zone, which reduces the forces transmitted to a vehicle occupant in a rear-end crash and attenuates a rearward displacement which might lead to a whiplash injury.

If not only a unilateral support is desired, a further reinforcement part of the same type can of course also be provided, which is arranged in longitudinal direction before the adjusting gear unit to absorb forces introduced in a rear-end crash, which thus even in a rear-end crash ensures a rigid connection of the adjusting gear unit to the associated vehicle part, for example the guide rail.

To support the forces introduced in the longitudinal direction of the spindle, the reinforcement part for example can include supporting ribs. When the reinforcement part is U-shaped in cross-section transversely to the longitudinal direction of the spindle, these supporting ribs can be formed by the legs of the U-shape. When the adjusting gear unit protrudes from the first vehicle part, for example the guide rail, in a vertical direction transversely to the longitudinal direction of the spindle, the supporting ribs then advantageously extend in parallel planes defined by the vertical direction and the longitudinal direction, so that forces directed in the longitudinal direction act in the plane of the supporting ribs and hence advantageously can be supported via the supporting ribs. To support forces introduced in the longitudinal direction, the supporting ribs are arranged in longitudinal direction behind the adjusting gear unit and under the influence of such force establish a rigid connection of the adjusting gear unit.

In another exemplary embodiment, the reinforcement part also can be formed as a cube-shaped block arranged on the first vehicle part, which is formed for the substantially deformation-free absorption of forces introduced in the longitudinal direction of the spindle. The block also is arranged in longitudinal direction behind the adjusting gear unit and supports forces acting in the longitudinal direction, so that with forces introduced in the longitudinal direction for example in a frontal crash a rigid connection of the adjusting gear unit for example to the guide rail is ensured.

The reinforcement part for example can be formed as cold extrusion part. Cold extrusion refers to a forming method in which the material is caused to flow under the influence of a high pressure. Forming is effected at room temperature and provides for a high dimensional accuracy and surface quality.

The semifinished products for manufacturing such reinforcement parts for example can be made of a sintered material, in particular a sintered metal.

The adjusting gear unit is arranged on a vehicle part, for example a guide rail of a vehicle seat to be adjusted, and firmly connected with the same. The connection for example can be made via a transmission housing of the adjusting gear unit via suitable fastening points at the transmission housing. In a first variant, the reinforcement part can be formed as additional part and for example be positively connected with the transmission housing of the adjusting gear unit via a web engaging into a groove. In a second variant it is, however, also conceivable that the reinforcement part is integrally formed with the transmission housing for the unilateral support and stiffening of the transmission housing and for the connection of the transmission housing to the associated vehicle part. In both variants, fastening points for connecting the adjusting gear unit with the first vehicle part can be formed at the transmission housing and/or at the reinforcement part and provide for an attachment of the transmission housing to an associated guide rail for example by using screw connections.

In the embodiment described above, the connection of the adjusting gear unit with the associated vehicle part, for example the guide rail, is achieved directly via the transmission housing. A separate, additional holding bracket can be omitted in this case, so that the construction is simplified and the number of the required components is reduced.

It is, however, also conceivable that the adjusting gear unit is attached to the first vehicle part via a holding bracket which partly encloses a transmission housing of the adjusting gear unit. In this case, the reinforcement part can be arranged on the holding bracket, for example be pressed onto the holding bracket or be welded to the holding bracket. It is also conceivable that the reinforcement part is integrally formed with the holding bracket, for example in that supporting ribs are directly molded to the holding bracket.

In a concrete aspect, the holding bracket can be attached to the first vehicle part via a flange, for example be welded or screwed to the vehicle part via the flange. In this case, the reinforcement part can be arranged on the flange of the holding bracket and be formed by legs extending along the longitudinal direction, so that forces acting along the longitudinal direction advantageously can be supported at least in one direction of force for unilaterally increasing the rigidity. The legs for example can be formed integrally with the flange or also be attached to the flange as separate components, for example be welded to the flange.

As is known conventionally, the holding bracket includes two legs and a base connecting the legs with each other. The adjusting gear unit here is arranged between the legs of the holding bracket, so that the adjusting gear unit is accommodated in a U-shaped receptacle formed by the legs and the base and is held in the receptacle. For the additional reinforcement—in addition to the reinforcement provided by the reinforcement part—a reinforcing bracket then can be provided, which includes a leg and a flange extending at right angles to this leg and preferably is welded to the holding bracket. The reinforcing bracket advantageously is arranged on a first one of the legs of the holding bracket such that the first leg of the holding bracket is arranged between the leg of the reinforcing bracket and the reinforcement part. There is obtained a construction in the manner of a sandwich, in which the first leg of the holding bracket is enclosed between the reinforcing bracket on the one hand and the reinforcement part on the other hand.

The reinforcement part can be arranged outside the U-shaped receptacle of the holding bracket (in which the adjusting gear unit is arranged), whereas the leg of the reinforcing bracket engages into the U-shaped receptacle. If the holding bracket additionally includes flanges arranged at the legs of the holding bracket for attachment to the first vehicle part for example formed as guide rail, the flange associated to the first leg of the holding bracket also can be enclosed between the additional reinforcing bracket on the one hand and the reinforcement part on the other hand.

Instead of arranging the reinforcement part directly at the holding bracket, it is also possible to fix the reinforcement part at the first vehicle part. If the first vehicle part for example is formed as a guide rail extending along the longitudinal direction, which in a cross-section vertical to the longitudinal direction has a substantially U-shaped cross-section and is formed by a base and lateral legs connected with each other via the base, the reinforcement part for example can be formed as a plate extending transversely to the longitudinal direction, which via at least one lateral edge portion is connected, for example welded or screwed, to at least one leg of the guide rail. The edge portion possibly can also be positively plugged into a corresponding cutout at the lateral leg of the guide rail and be welded to the leg via this positive plug connection. It is also conceivable that the reinforcement part reaches through one of the legs of the guide rail and is screwed or also welded to the leg via a fastening portion resting against the outside of the leg.

It is conceivable to connect this plate, which transversely extends in the guide rail and forms the reinforcement part, with the guide rail at a plurality of edge portions, in particular weld the same such that the plate is firmly connected with the guide rail via a plurality of edge portions. It is, however, also conceivable to firmly connect, in particular weld, the reinforcement part to one of the legs of the guide rail with merely one, first edge portion. Another, second edge portion of the plate-shaped reinforcement part then can engage into a cutout of the other one of the legs of the guide rail, wherein this engagement can be accomplished such that in normal operation and with the load forces occurring in normal use the second edge portion is not in contact with the guide rail. In this case, the engagement of the second edge portion into the associated cutout of the leg only takes effect in case of a crash, in which due to a deformation of the guide rail or the reinforcement part the second edge portion gets in contact with the border of the associated cutout of the leg and thus creates an additional support. On the one hand, with large forces acting in case of a crash, an additional support thus can be created for a secure hold of the adjusting gear unit on the associated vehicle part. On the other hand, due to the fact that the reinforcement part is not in contact with the guide rail via the second edge portion, a generation of noise as a result of a rail deformation is avoided in normal operation under a normal load of use (the so-called rail breathing). For this purpose, the second edge portion of the reinforcement part loosely lies in the cutout of the associated leg with sufficient clearance, so that a contact with the legs only can occur with extraordinary loads occurring in case of a crash.

In an alternative configuration of a reinforcement part arranged on a leg of the guide rail, the reinforcement part also can be formed as a plate which extends along the longitudinal direction and is attached to one of the lateral legs of the guide rail, for example screwed or welded to this leg. The reinforcement part thus rests flat against the inside of one of the legs and reinforces the holding bracket, in that it serves as a unilateral support for the holding bracket. In this case, the plate-shaped reinforcement part does not completely or almost completely close the cross-section of the guide rail, but is merely formed as support in the region of one of the legs.

As seen along the longitudinal direction, the reinforcement part advantageously is arranged on the first vehicle part with a distance to a leg of the holding bracket extending transversely to the longitudinal direction, which is arranged on a side of the transmission housing facing the reinforcement part. This results in that in normal operation, in which the occurring load forces are compensated and supported by the holding bracket, the reinforcement part has no effect on the holding bracket, but is spaced from the holding bracket along the longitudinal direction, so that there is no contact between the holding bracket and the reinforcement part. Only in case of a crash and the resulting deformation of the holding bracket does the reinforcement part get in contact with the holding bracket, namely the leg of the holding bracket facing the reinforcement part, so that in case of a crash the holding bracket is supported via the reinforcement part and the load forces occurring in case of a crash can be dissipated via the reinforcement part into the associated vehicle part.

In the embodiments described above it is also conceivable that the reinforcement part is formed integrally with the first vehicle part, i.e. for example protrudes from a guide rail as formation and supportingly cooperates with the adjusting gear unit or the holding bracket enclosing the adjusting gear unit.

By providing the reinforcement part it is achieved that the adjusting gear unit and its connection to the first vehicle part are supported unilaterally. By including the reinforcement part, the connection can be sized and dimensioned such that due to the supporting effect of the reinforcement part with forces introduced in the longitudinal direction from the first vehicle part into the adjusting gear unit, an offset between the first vehicle part and the second vehicle part of less than 10 mm, preferably less than 5 mm can occur, and with forces introduced against the longitudinal direction from the first vehicle part into the adjusting gear unit an offset between the first vehicle part and the second vehicle part between 20 and 40 mm, preferably about 30 mm, can occur. By providing the reinforcement part, when a force acts in the longitudinal direction, a substantially rigid and dimensionally stable connection is provided with minimal offset, whereas when a force acts in the opposite direction a deformation in the sense of a crumple zone becomes possible with a noticeable offset. For example in a frontal crash a deformation thus can largely be excluded, so that no offset occurs, whereas in a rear-end crash the vehicle parts are offset to each other by a distance with a deformation, in order to thereby attenuate the forces acting on a vehicle occupant.

BRIEF DESCRIPTION OF THE DRAWINGS

The idea underlying the invention will be explained in detail below with reference to the exemplary embodiments illustrated in the Figures:

FIG. 9a shows a schematic view of an adjusting gear unit with an integrally molded reinforcement part.

FIG. 9b shows a schematic view of an adjusting gear unit with a positively connected reinforcement part.

FIG. 9c shows a schematic view of an adjusting gear unit with two reinforcement parts.

FIG. 11 shows a perspective view of a further exemplary embodiment of a reinforcement part for supporting a holding bracket connecting the adjusting gear unit with a guide rail.

FIG. 14b shows another perspective view of the holding bracket of FIG. 14a.

FIG. 16b shows another perspective view of the holding bracket of FIG. 16a.

FIG. 17b shows a view of the exemplary embodiment of FIG. 17a in a perspective view, with the holding bracket and the reinforcement part being shown in broken lines.

FIG. 17c shows an enlarged representation of a detail of the view of FIG. 17b.

FIG. 18b shows a perspective view of the holding bracket and the reinforcement part on the guide rail.

FIG. 18c shows an enlarged representation of a detail of the view of FIG. 18b.

FIG. 19b shows another perspective view of the arrangement of FIG. 19a.

FIG. 20b shows a side view of the arrangement of FIG. 20a.

DETAILED DESCRIPTION

Figure 1:
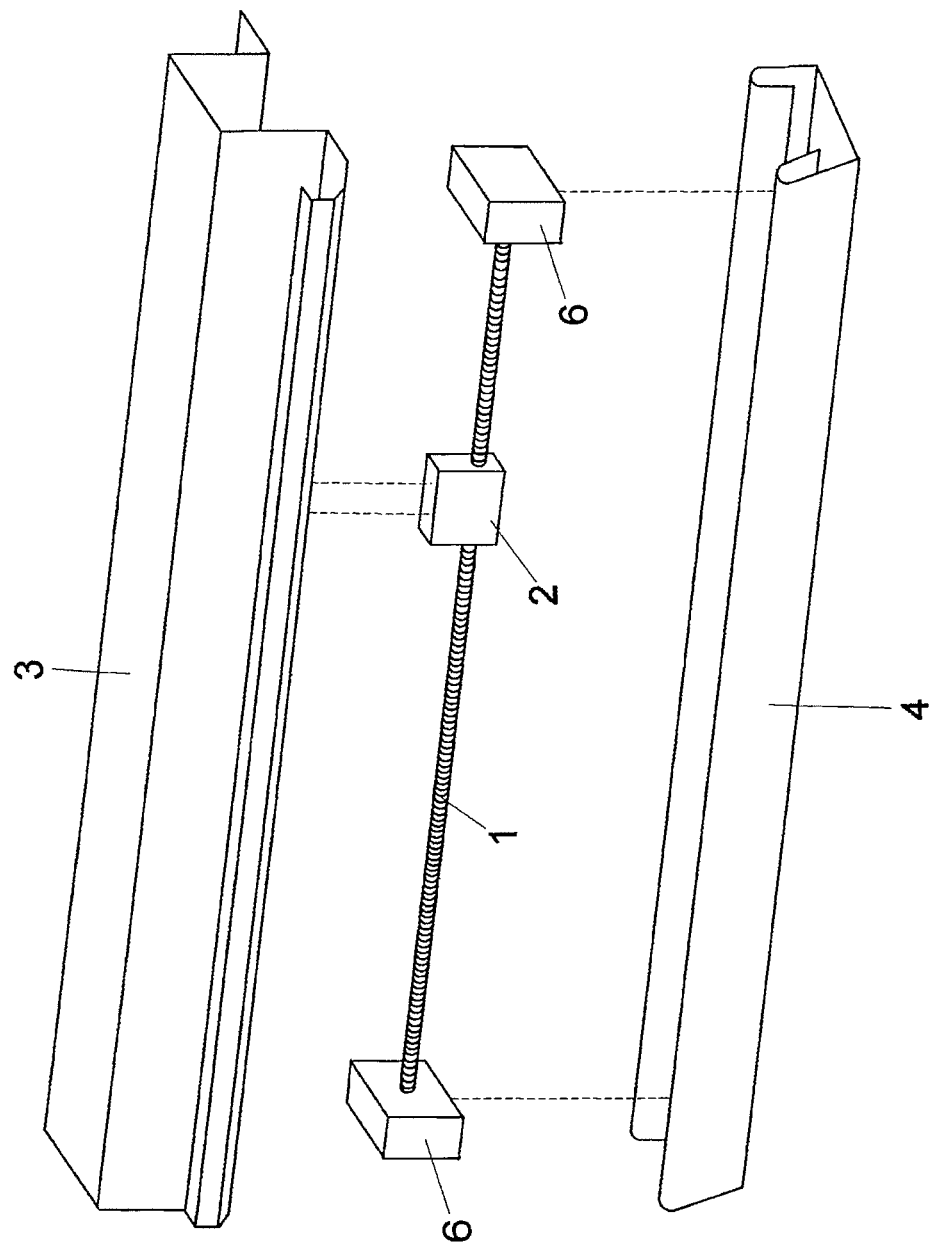
FIG. 1 shows a schematic overview of an adjusting means in the form of a spindle gear unit for the longitudinal setting of a vehicle seat.

FIG. 1 shows an overview representation of an adjusting means in the form of a longitudinal seat adjustment for a vehicle seat. The adjusting means includes an upper guide rail 3 connected with the vehicle seat and a lower guide rail 4 connected with a vehicle floor, which are shiftable relative to each other along a longitudinal direction X corresponding to the longitudinal vehicle direction.

The adjusting means realizes a spindle gear unit with an adjusting gear unit 2 arranged on the upper guide rail 3, which is in engagement with a spindle 1 stationarily and non-rotatably arranged on the lower guide rail 4 via fixtures 6.

Figure 2:
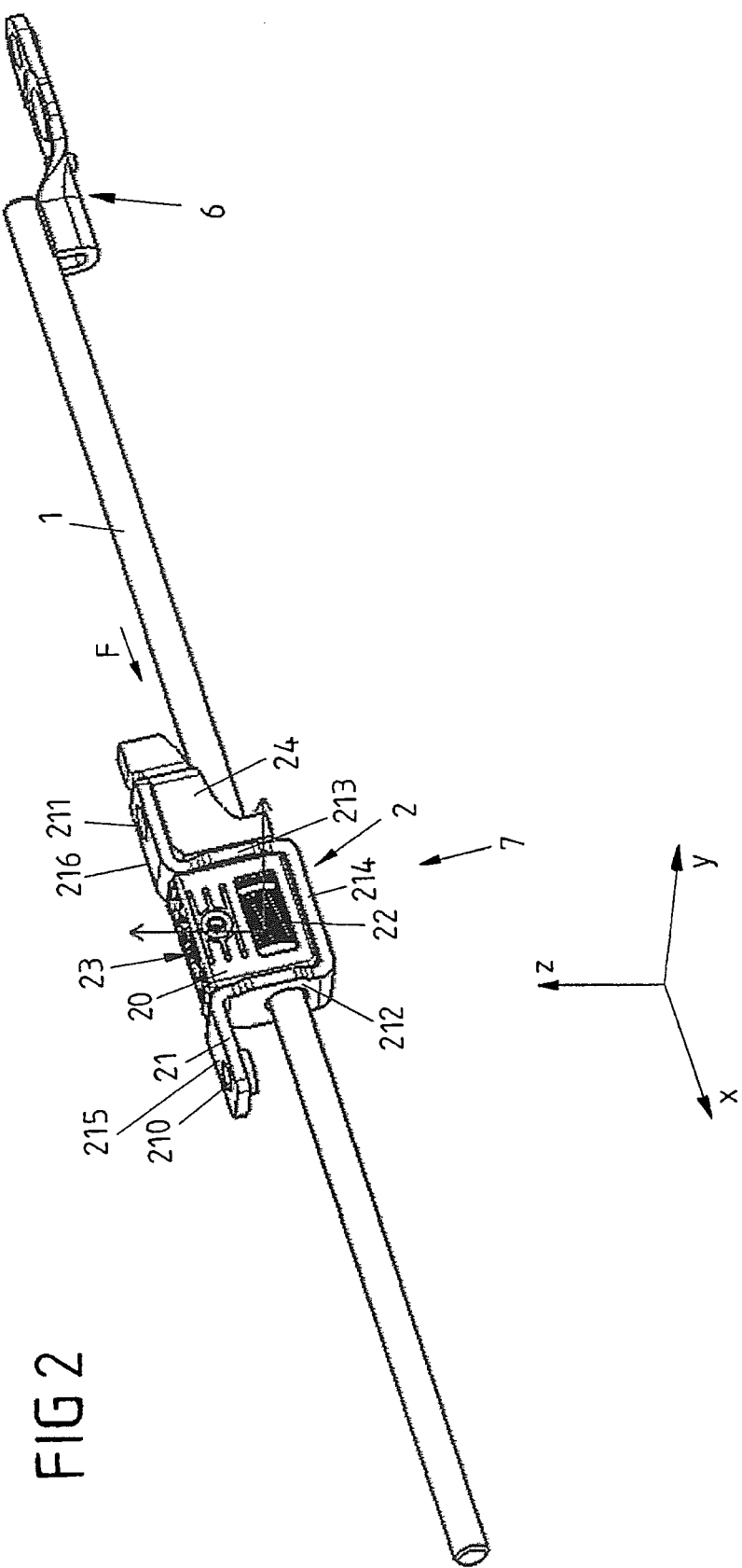
FIG. 2 shows a perspective view of an adjusting gear unit on a spindle of an adjusting means.
Figure 3:
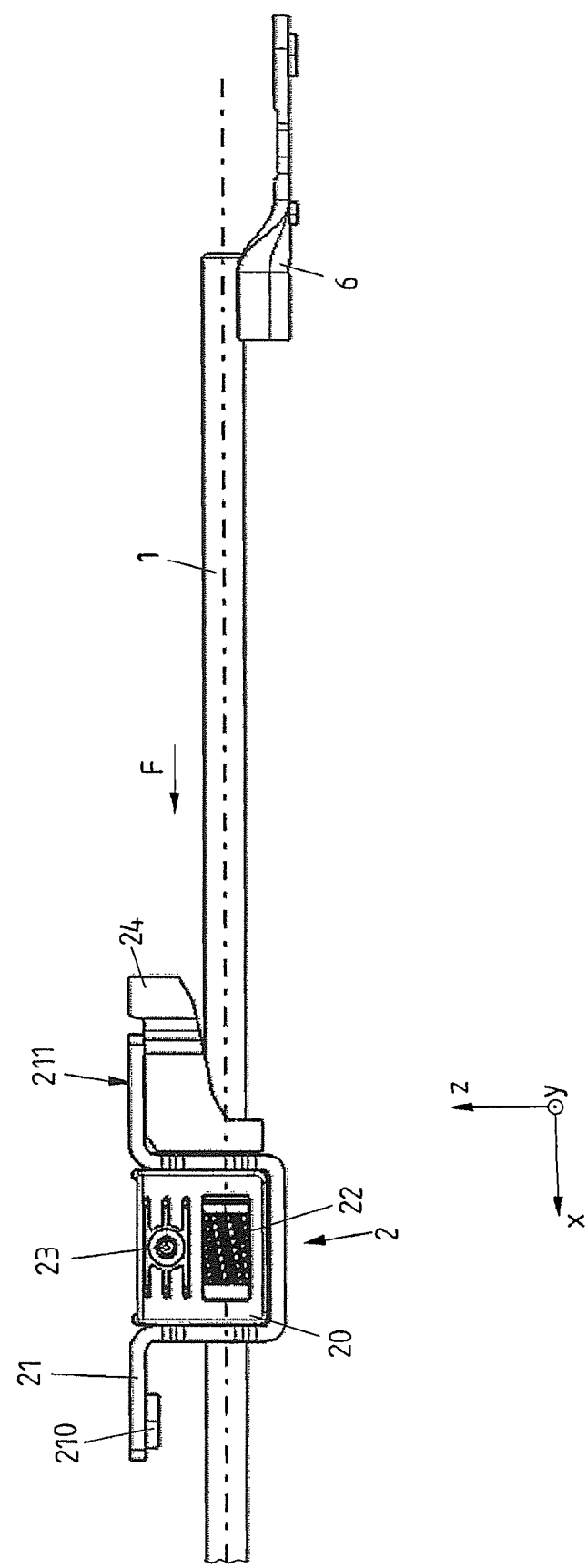
FIG. 3 shows a side view of the arrangement of FIG. 2.
Figure 4:
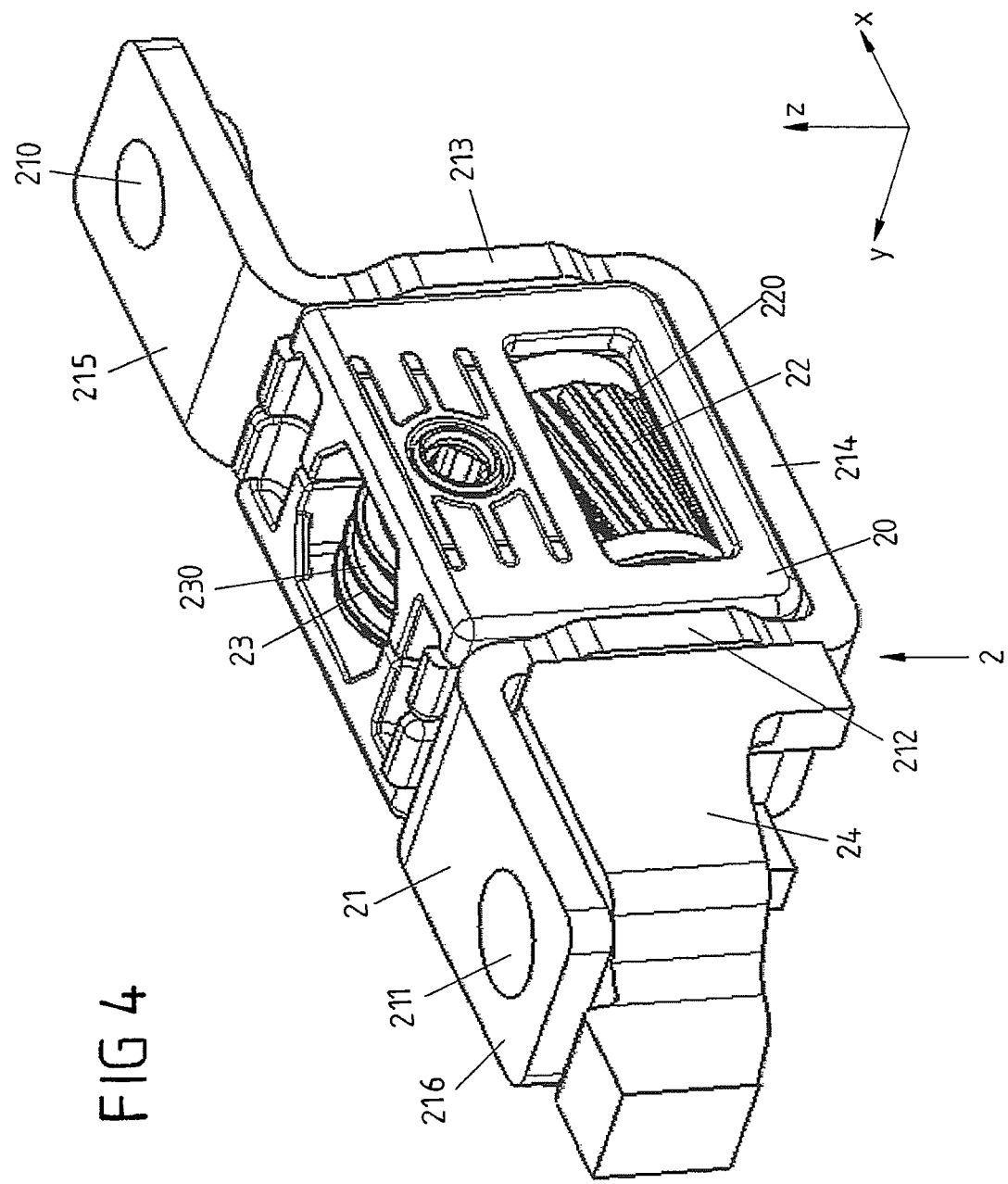
FIG. 4 shows a perspective view of the adjusting gear unit obliquely from behind.
Figure 5:
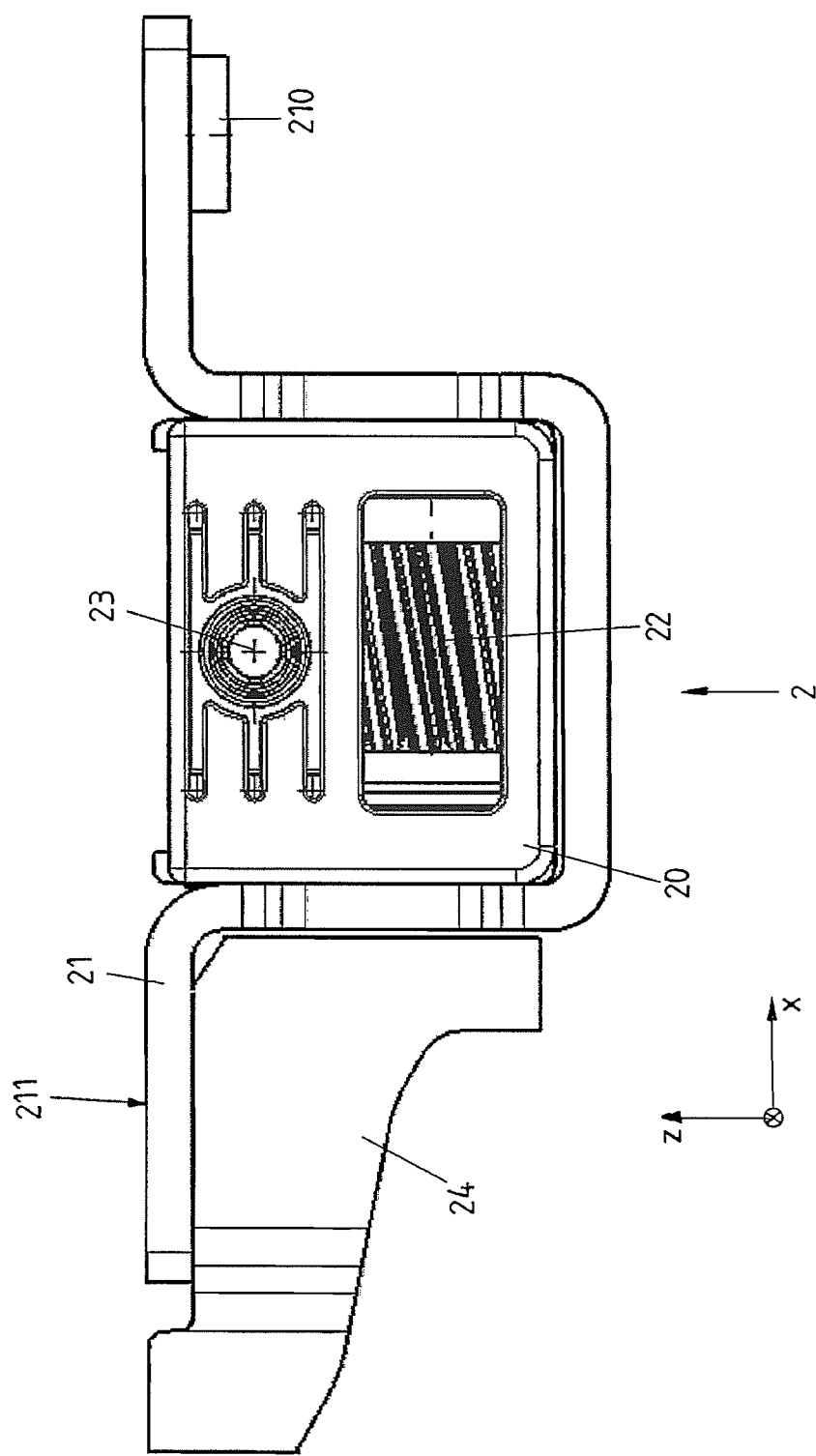
FIG. 5 shows a side view of the adjusting gear unit of FIG. 4.
Figure 6:
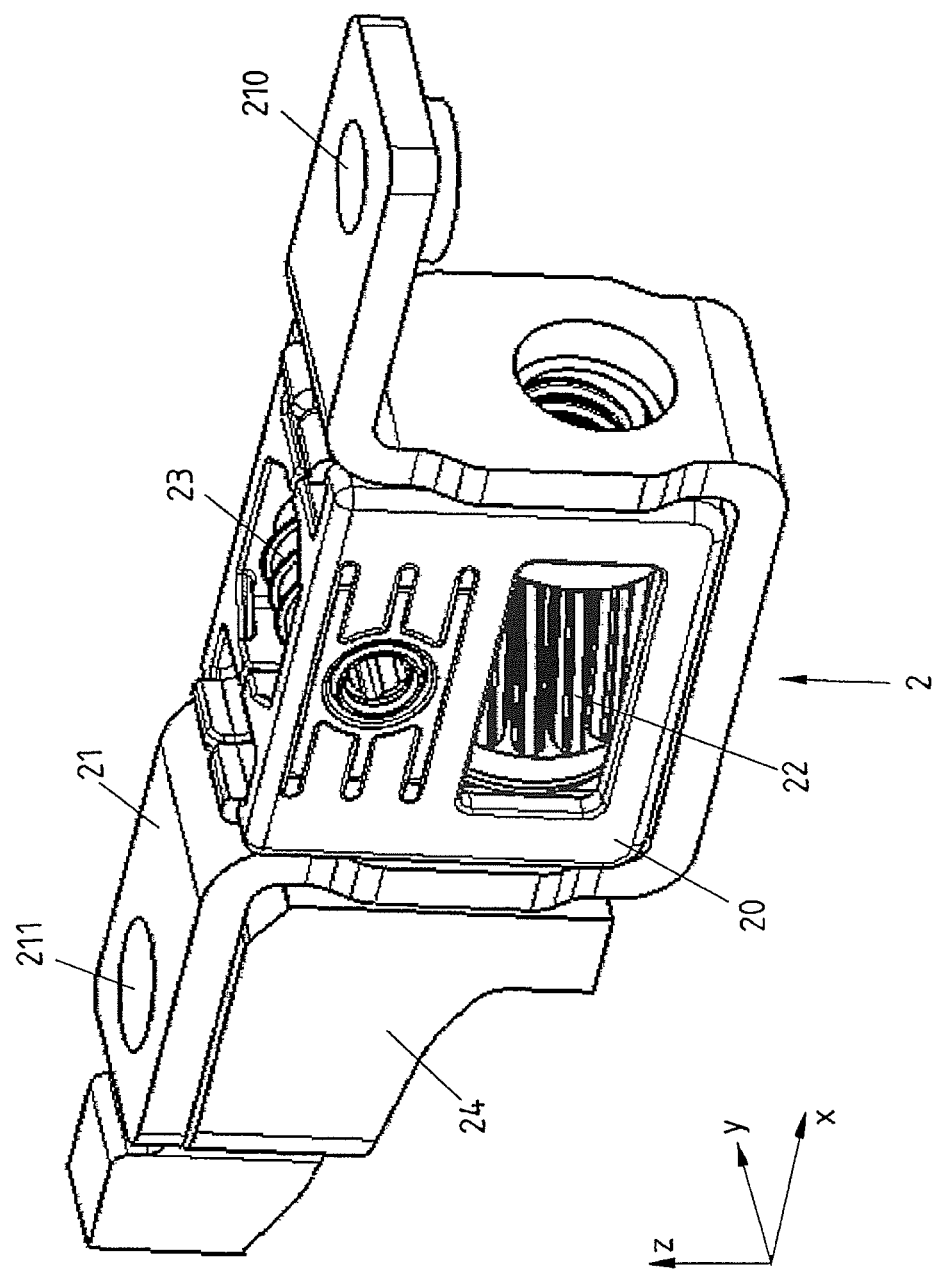
FIG. 6 shows a perspective view of the adjusting gear unit obliquely from the front.

As shown in FIG. 2 and FIG. 4, the adjusting gear unit for example, as is known from DE 103 37 475 A1 and DE 10 2006 049 809 A1, can include a spindle nut 22 which with an internal toothing in the form of a female thread is in engagement with the male thread of the spindle 1. Via an external toothing 220 the spindle nut 22 furthermore is in meshing engagement with a worm toothing 230 of a drive worm 23. For operation of the adjusting means, the spindle nut 22 is put into a rotary movement via the (for example power-driven) drive worm 23 and thereby rolls on the spindle 1, in order to shift the adjusting gear unit 2 and the upper guide rail 3 connected with the adjusting gear unit 2 along the spindle 1. In this way, the longitudinal position of the vehicle seat along the longitudinal vehicle direction X can be adjusted by a user in a power-operated way.

In the longitudinal direction X, along which the spindle 1 extends, the vehicle seat hence is held via the adjusting gear unit 2. The adjusting gear unit 2 therefore must be designed such that it can suitably absorb the load forces, in particular the forces introduced during a crash from the guide rail 3 in the longitudinal direction X, such that the vehicle seat is prevented from slipping through during a crash, in order to exclude a sudden shifting of the vehicle seat and injuries of a vehicle occupant resulting therefrom.

The connection of the adjusting gear unit 2 to the upper guide rail 3 therefore must have a sufficient strength. In particular during a frontal crash, the connection also should have a large enough rigidity, in order to avoid a forward displacement of a belt connecting point holding a seat belt and to rigidly absorb the forces acting during a frontal crash. During a rear-end crash, however, a too rigid connection can result in that the acting crash forces are directly transmitted to the vehicle occupant and lead to an abrupt rearward displacement of the vehicle occupant, in particular of his head. To avoid injuries, for example a whiplash injury, of the vehicle occupant, it is desirable to at least attenuate such rearward displacement.

FIGS. 2 to 7 show a first configuration of an adjusting means, in which for the unilateral support of the adjusting gear unit 2 with respect to the guide rail 3 a reinforcement part 24 is provided, which is formed and provided to absorb the forces F acting on the adjusting gear unit 2 in longitudinal direction X of the spindle 1 and to support the adjusting gear unit 2, when a force acts in this longitudinal direction X. The idea underlying such reinforcement part 24 is to provide a unilateral support of the adjusting gear unit 2 with respect to the guide rail 3. By this unilateral support it is achieved that when forces act in the longitudinal direction X, the adjusting gear unit 2 and its connection to the guide rail 3 cannot be deformed, i.e. the connection has a high rigidity. The longitudinal direction X here corresponds to the longitudinal vehicle direction and is directed in direction of the forward travel of a vehicle, so that the forces F generated in a frontal crash as a result of the inertia of the vehicle seat and a seat occupant are supported via the reinforcement part 24 and in a frontal crash the adjusting gear unit 2 is held in a rigid way.

However, when a force acts in the opposite direction against the longitudinal direction X, the adjusting gear unit 2 is not supported, so that the adjusting gear unit 2 can be deformed at least by a small distance and, in the sense of a crumple zone, the forces acting during a crash are not directly and rigidly transmitted. In a rear-end crash, in which forces act on the adjusting gear unit 2 against the longitudinal direction X, the adjusting gear unit 2 and its connection to the guide rail 3 cannot be deformed without this being prevented by the reinforcement part 24, so that in case of a crash at least part of the energy is absorbed in the adjusting gear unit 2 and in its connection.

In the embodiment shown in FIGS. 2 to 7, the adjusting gear unit 2 is connected with the guide rail 3 via a holding bracket 21. The holding bracket 21 describes a U-shape, at least partly encloses a transmission housing 20 of the adjusting gear unit 2 via lateral legs 212, 213 and a base 214 (FIG. 4), and is connected with the guide rail 3 via fastening points 210, 211 at lateral flanges 215, 216, for example by screw connections.

The reinforcement part 24 for example formed as cold extrusion part is attached to the holding bracket 24 in longitudinal direction X behind the adjusting gear unit 2. The reinforcement part 24 can be pressed onto the holding bracket 21 or also be screwed to the holding bracket 21 and the guide rail 3 via a screw connection reaching through the fastening point 211.

Figure 7:
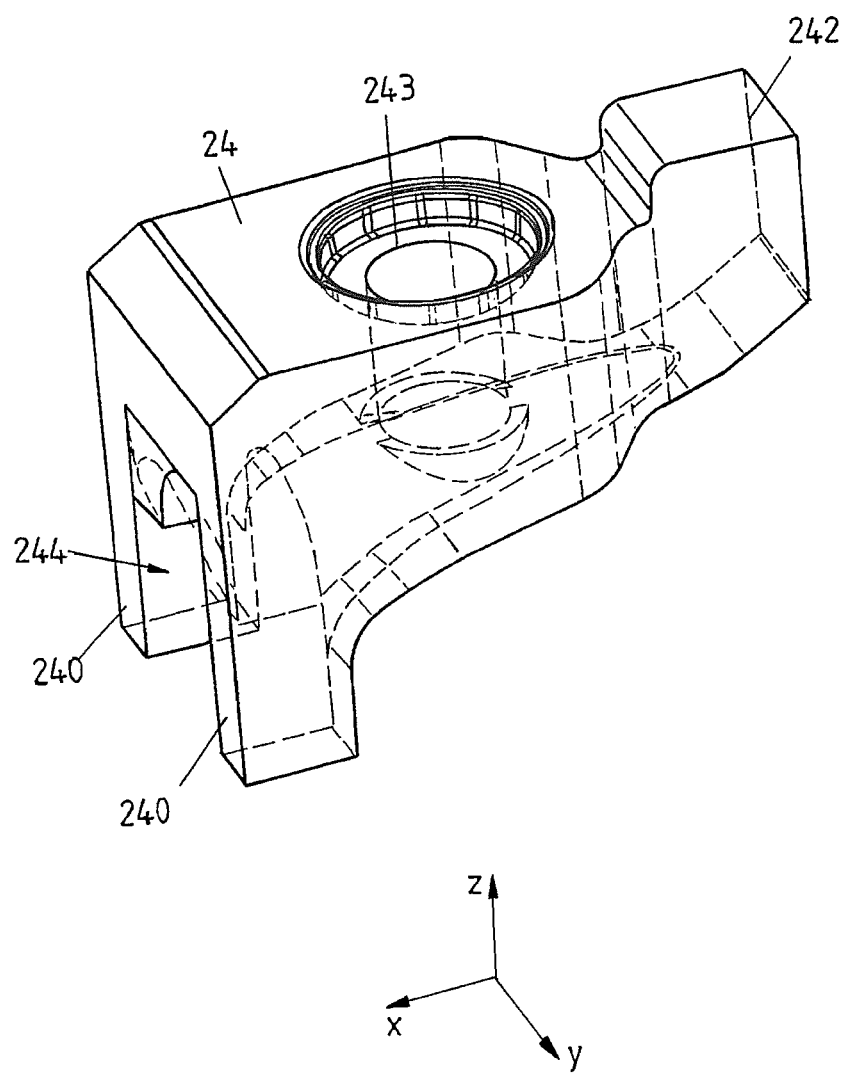
FIG. 7 shows a perspective view of a reinforcement part of the adjusting gear unit.

An enlarged, perspective view of the reinforcement part 24 is shown in FIG. 7. In a cross-section to the longitudinal direction X, the reinforcement part 24 has a U-shape with two lateral legs 240 which extend in parallel planes defined by the longitudinal direction X and a vertical direction Z and leave a cutout 244 between themselves, through which the spindle 1 extends in an operative position (see for example FIG. 2). The legs 240 are tapered against the longitudinal direction X and run into an end-side block 242, which in the mounted condition of the adjusting gear unit 2 rests against the guide rail 3. Centrally on the reinforcement part 24 a through opening 243 is arranged, which in the proper position of the reinforcement part 24 is in alignment with the fastening point 211 (FIG. 2), and via which the reinforcement part 24 for example can be connected with the holding bracket 21 and the guide rail 3 via a screw connection.

Figure 8A:
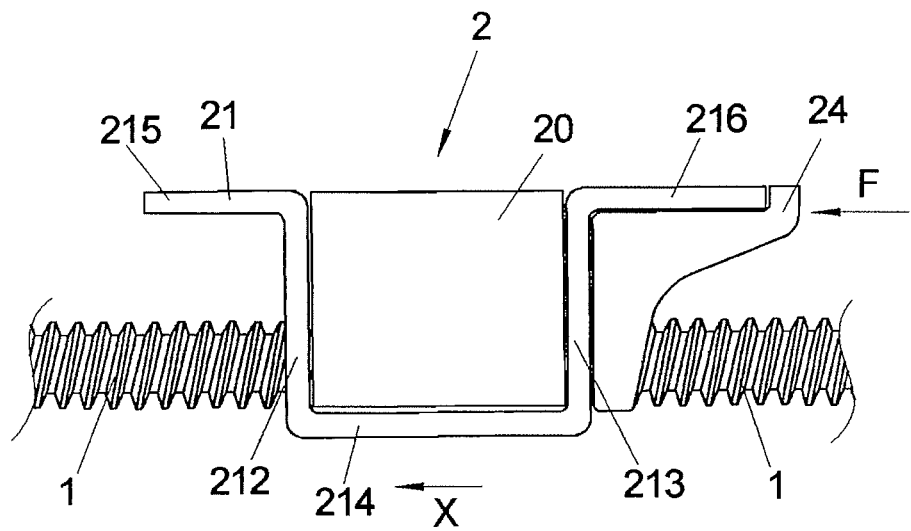
FIG. 8a shows a schematic view representing the supporting effect of the reinforcement part in a frontal crash.

The legs 240 of the reinforcement part 24 form lateral supporting ribs for supporting forces F acting in the longitudinal direction X. Due to the fact that the legs 240 forming the supporting ribs extend parallel to the longitudinal direction X and to the vertical direction Z, the forces F acting in the longitudinal direction X are introduced in the plane of the legs 240. In that the holding bracket 21 rests against the reinforcement part 24 with its lateral leg 213, the holding bracket 21 and thereby the adjusting gear unit 2 is supported with forces F introduced in the longitudinal direction X from the guide rail 3 into the adjusting gear unit 2 and cannot be deformed, so that a rigid connection of the adjusting gear unit 2 to the guide rail 3 is provided. This is illustrated in FIG. 8a: When forces F are applied in the longitudinal direction X, the holding bracket 21 cannot be deformed due to the supporting effect of the reinforcement part 24. This corresponds to the situation in a frontal crash, in which thus a rigid connection of the adjusting gear unit 2 to the guide rail 3 and hence a rigid connection of the guide rails 3, 4 with each other is provided.

Figure 8B:
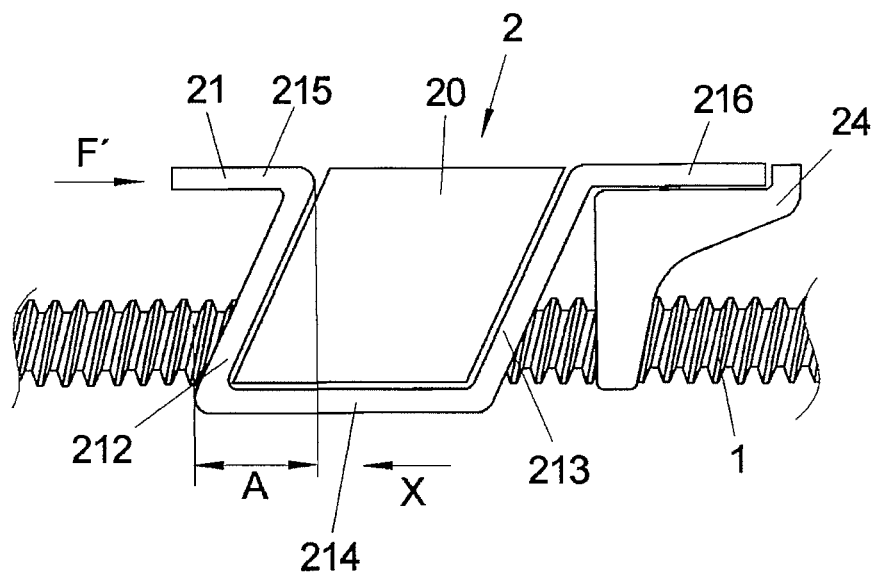
FIG. 8b shows a schematic view representing the deformation of the adjusting gear unit and a holding bracket holding the adjusting gear unit in a rear-end crash.

With an opposite action of forces in a rear-end crash, in which forces act on the adjusting gear unit 2 against the longitudinal direction X, the reinforcement part 24 remains unloaded and has no supporting effect on the holding bracket 21. This is illustrated in FIG. 8b. When forces F' act on the adjusting gear unit 2 against the longitudinal direction X as a result of the inertia of the vehicle seat and a vehicle occupant in a rear-end crash, the holding bracket 21 can be deformed as shown by tilting the legs 212, 213.

Since the reinforcement part 24 is arranged behind the adjusting gear unit 2 in direction of action of the force F', the reinforcement part 24 cannot counteract such deformation. The upper guide rail 3 connected with the holding bracket 21 and the lower guide rail 4 connected with the spindle 1 thus can shift relative to each other by an offset A. In this case, the adjusting gear unit 2 and the holding bracket 21 serve as a kind of crumple zone and absorb part of the crash energy as deformation energy, so as to attenuate the forces transmitted to a vehicle occupant and in particular weaken an abrupt rearward displacement of a vehicle occupant in a rear-end crash, which possibly might lead to a whiplash injury.

Other embodiments of an adjusting gear unit 2 with reinforcement part arranged thereon are shown in FIGS. 9a to 9c. In contrast to the embodiment of FIGS. 2 to 7, the adjusting gear unit 2 here is not connected with the guide rail 3 via a holding bracket, but directly via fastening points 110, 111 arranged on the transmission housing 20 and/or on the reinforcement part 24', 24", 25'. In the variants shown in FIGS. 9a to 9c a holding bracket hence is omitted.

In the embodiment of FIG. 9a, a reinforcement part 24' is integrally formed with a transmission housing 20 of the adjusting gear unit 2. The reinforcement part 24' in turn serves the unilateral support of the adjusting gear unit 2 and in particular of its transmission housing 20. The mode of operation is analogous to the one described above.

In the variant of FIG. 9b, a reinforcement part 24" is formed as separate, additional component, but is positively connected with the transmission housing 20 of the adjusting gear unit 2 via a web 245B engaging into a groove 245A. The reinforcement part 24" can be pushed onto the transmission housing 20 along a shifting direction V and in the operative position is then positively held at the transmission housing 20. The supporting mode of operation in turn is analogous to the one described above.

In the variant of FIG. 9c, two reinforcement parts 24", 25' are provided, which thus provide a bilateral support of the adjusting gear unit 2. In the illustrated example, the reinforcement part 24" on the right side in FIG. 9c is positively connected with the transmission housing 20, while the reinforcement part 25' on the left side in FIG. 9c is integrally formed with the transmission housing 20. Other combinations, for example two separate, additional reinforcement parts, are of course conceivable. In the variant of FIG. 9c, there is not only provided a unilateral, stiffening support, but a support on both sides of the adjusting gear unit 2 with a force acting both in the longitudinal direction X and against the longitudinal direction X, so that both in a frontal crash and in a rear-end crash a rigid connection of the adjusting gear unit 2 is provided. The mode of action of the reinforcement parts 24", 25' each is analogous to what has been described above.

In the embodiments (with and without holding bracket) described above, means for the acoustic decoupling, for example acoustic sound-absorbing rubber pads or the like, can be provided on the transmission housing 20 and/or on the reinforcement part 24, 24', 24", 25'.

Figure 10A:
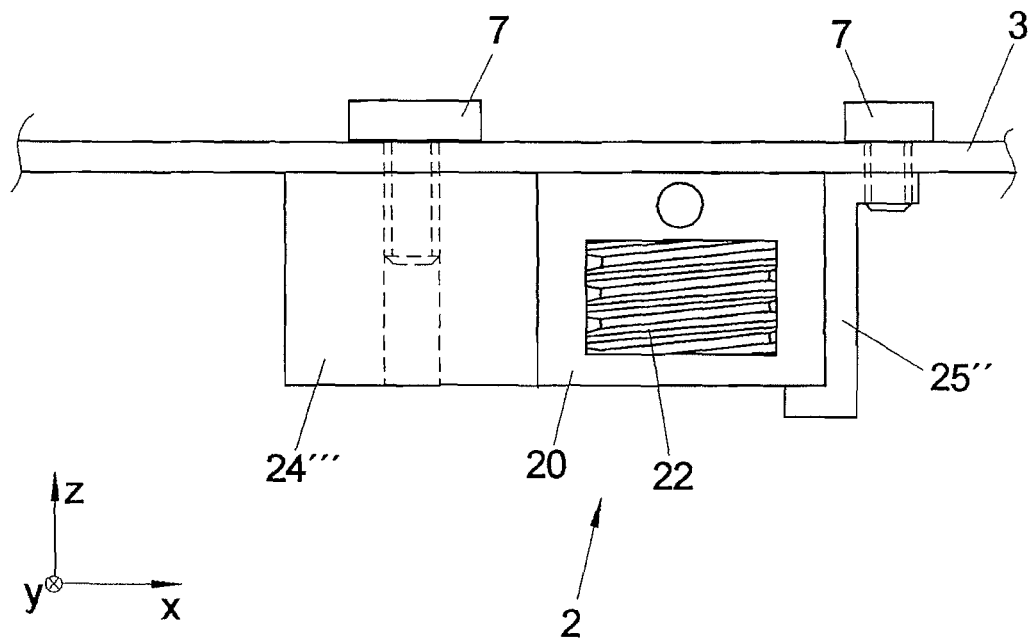
FIG. 10a shows a schematic view of an adjusting gear unit with a reinforcement part in the form of a block.

A further embodiment of an adjusting gear unit 2 with a reinforcement part 24''' arranged thereon is shown in FIG. 10a. The reinforcement part 24''' is formed as cube-shaped block (with a suitable lead-through for the spindle 1), which is arranged on one side of the transmission housing 20 of the adjusting gear unit 2 and is connected with the guide rail 3 via a fastening means in the form of a screw 7. In this way, a unilateral support of the transmission housing 20 is provided, which on its other side opposite the reinforcement part 24''' is held by a holding bracket 25" partly enclosing the transmission housing 20. When a force acts in the longitudinal direction X, the transmission housing 20 hence is rigidly supported, but is not when a force acts against the longitudinal direction X.

Figure 10B:
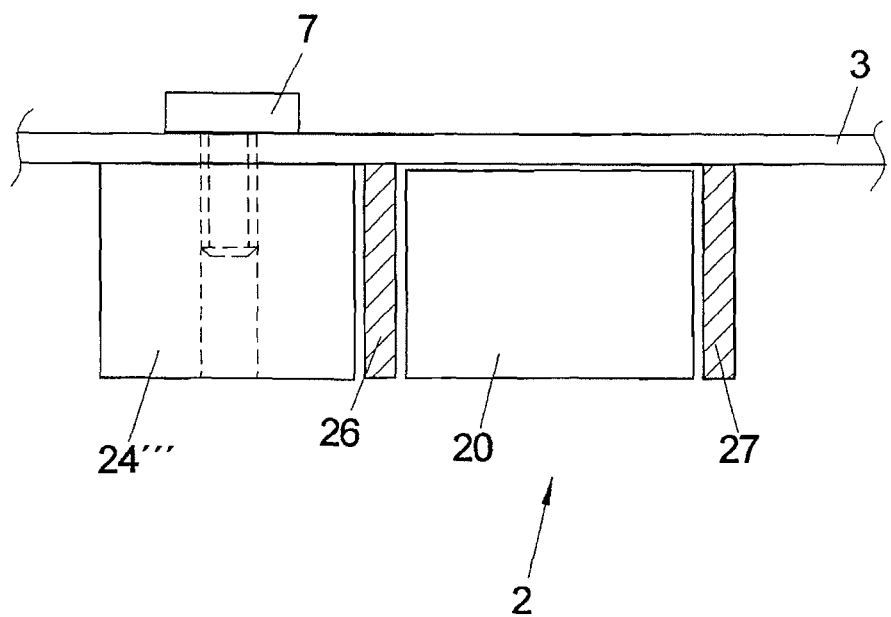
FIG. 10b shows a schematic view of an adjusting gear unit enclosed by two lateral sheets.

In an embodiment as shown in FIG. 10b, finally, a transmission housing 10 is held via lateral, for example welded sheet-metal parts 26, 27 firmly arranged on the guide rail 3. On the side of the one sheet-metal part 26 facing away from the adjusting gear unit 2 a reinforcement part 24''' is arranged in the form of a cube-shaped block which unilaterally supports the adjusting gear unit 2 or the sheet-metal part 25.

In the embodiment shown in FIG. 10b, the sheet-metal part 26 between the adjusting gear unit 2 and the reinforcement part 24''' can also be omitted. In this case, a welding operation can be saved (welding of the sheet-metal part 26 is omitted) and mounting the adjusting gear unit 2 and the associated spindle 1 to the guide rail 3 is simplified; in contrast to the arrangement with two sheet-metal parts 26, 27, in which the adjusting gear unit 2 initially is arranged on the guide rail 3 and subsequently the spindle 1 must be put through openings in the sheet-metal parts 26, 27 and the adjusting gear unit 2, the spindle 1 first can be arranged on the adjusting gear unit 2 and then together with the adjusting gear unit 2 on the guide rail 3 (and for this purpose be put through the sheet-metal part 27), when only one sheet-metal part 27 is used. The reinforcement part 24''', which includes a suitable cutout for the passage of the spindle 1, can be attached to the guide rail 3 previously or subsequently.

Figure 12:
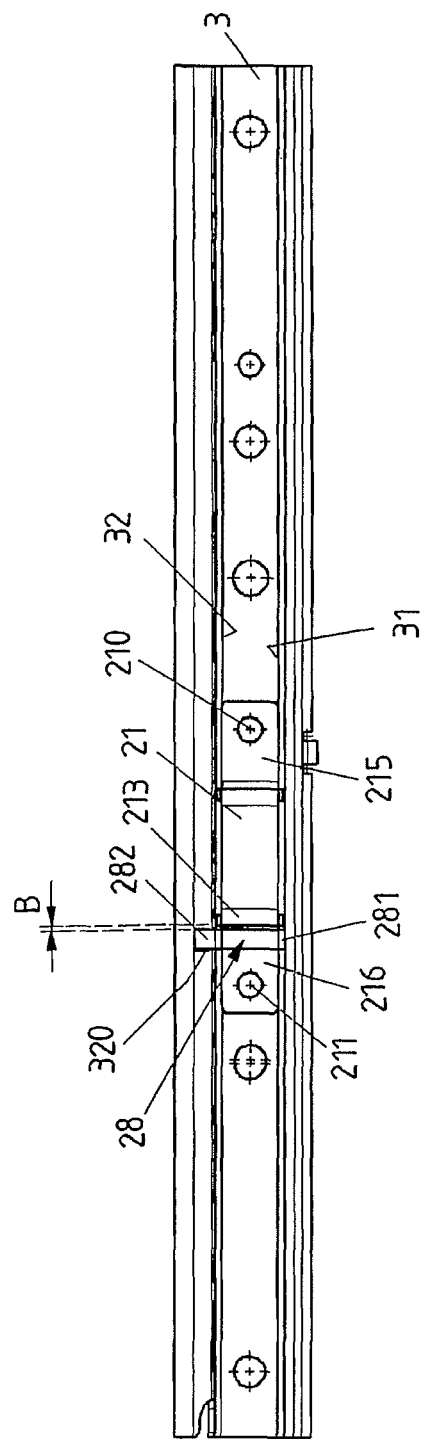
FIG. 12 shows a view of the exemplary embodiment of FIG. 11 from below.
Figure 13:
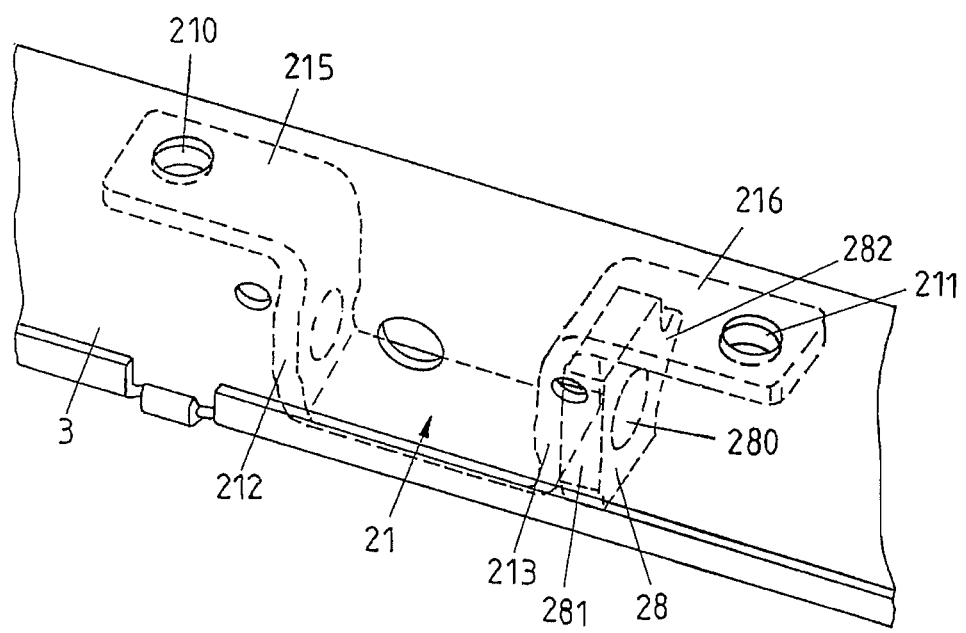
FIG. 13 shows an enlarged view of the exemplary embodiment of FIG. 11.
Figure 14A:
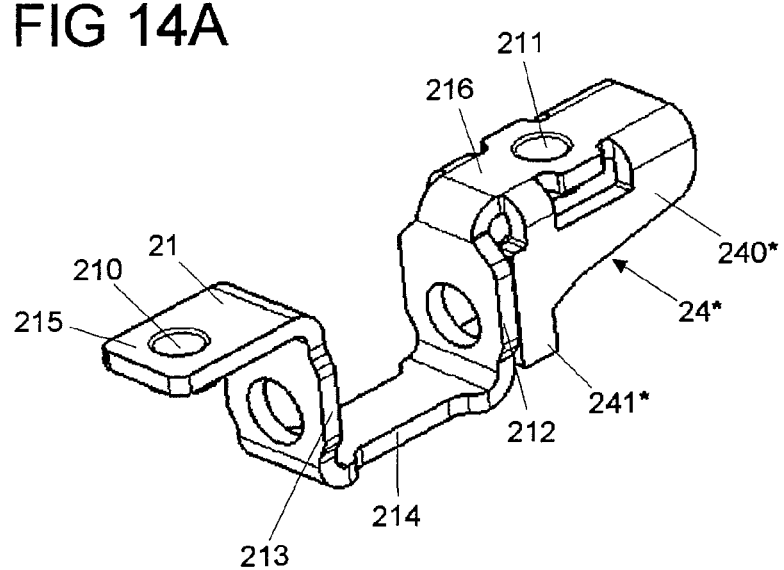
FIG. 14a shows a perspective view of a further exemplary embodiment of a holding bracket with an integrally molded reinforcement part.
Figure 14B:
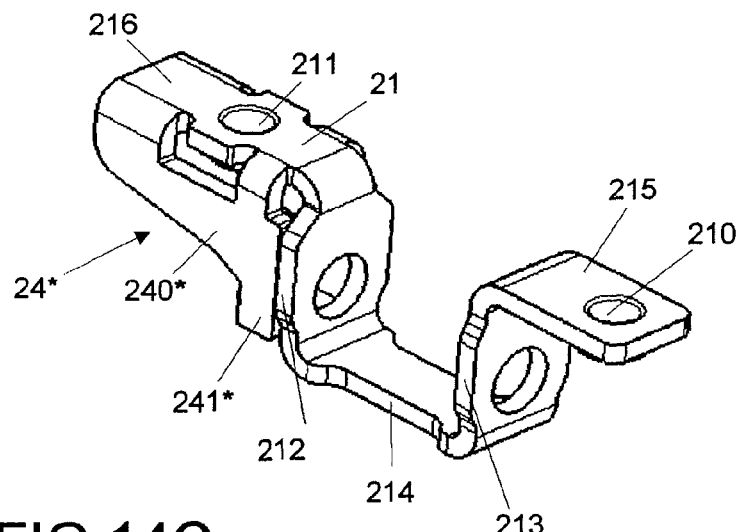
Figure 14C:
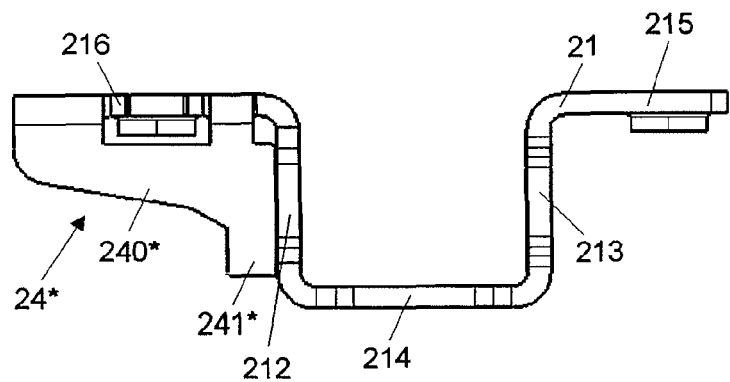
FIG. 14c shows a side view of the holding bracket of FIGS. 14a and 14b.
Figure 15A:
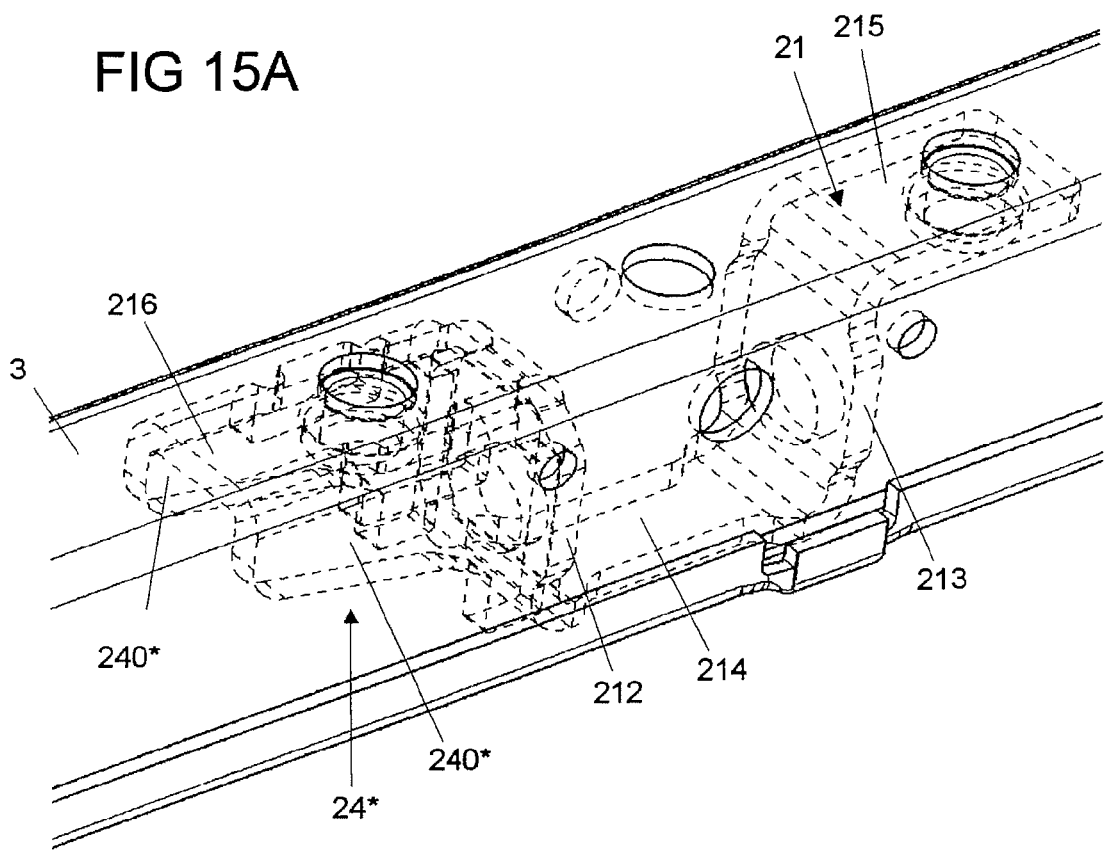
FIG. 15a shows a view of the holding bracket of FIGS. 14a to 14c on a guide rail.
Figure 15B:
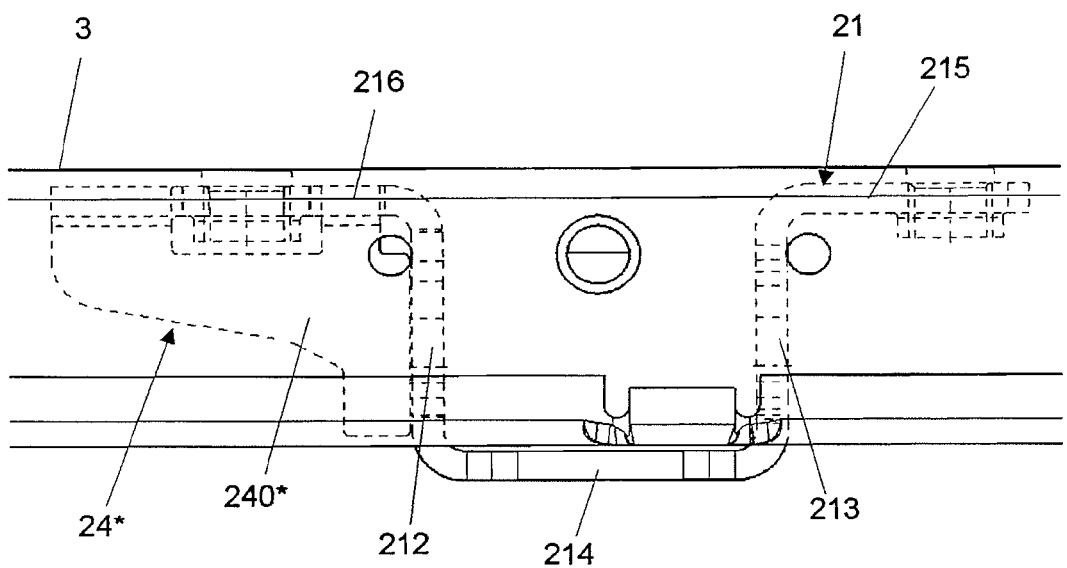
FIG. 15b shows a side view of the holding bracket on the guide rail.

FIGS. 11 to 13 show a further exemplary embodiment of a reinforcement part 28, which constitutes a plate extending transversely to the longitudinal direction X and is arranged in an interior space of the guide rail 3 formed by lateral legs 31, 32 and a base 30 of the guide rail 3. The reinforcement part 28 serves for the unilateral support of a holding bracket 21, which encloses the transmission housing 20 of the adjusting gear unit 2 (not shown in FIGS. 11 and 12) and thereby connects the adjusting gear unit 2, as explained above with reference to FIG. 2, with the upper guide rail 3. With a first edge portion 281, the reinforcement part 28 is firmly connected with the one leg 31 of the guide rail 3, while another, second edge portion 282, which is formed in the manner of a hook, engages into a cutout 320 on the leg 32 of the guide rail 3 (see FIG. 12) and lies in the cutout 320 such that in a normal operation of the adjusting means the edge portion 282 does not get in contact with the guide rail 3, in particular the circumferential border of the cutout 320 of the leg 32, so that in normal operation there is no contact between the second edge portion 282 and the guide rail 3. For this purpose, the second edge portion 282 lies in the cutout 320 on the leg 32 with sufficient clearance. Only with large load forces as a result of a crash and a resulting deformation of the guide rail 3, the holding bracket 21 and/or the reinforcement part 28, can the second edge portion 282 get in contact with the circumferential border of the cutout 320, so that in case of a crash an additional support is created and the reinforcement part 28 is safely held at the guide rail 3 and the holding bracket 21 is supported via the reinforcement part 28.

Due to the fact that the reinforcement part 28 is firmly connected with the guide rail 3 only with its one, first edge portion 281 and with its other, second edge portion 282 loosely lies in a cutout of the guide rail 3, a generation of noise in operation is avoided due to a slight deformation of the guide rail 3 in normal operation (the so-called rail breathing).

The reinforcement part 28 includes a through opening 280, through which the spindle 1 reaches in the mounted condition of the adjusting means (see also FIG. 2).

As shown in FIG. 12, the reinforcement part 28 is arranged with a distance B to the leg 213 of the holding bracket 21. In normal operation, the reinforcement part 28 thus is spaced from the holding bracket 21, so that the reinforcement part 28 is not in contact with the holding bracket 21. Only with large load forces as a result of a crash and the resulting deformation of the holding bracket 21 does the leg 213 get in contact with the reinforcement part 28, so that the holding bracket 21 is supported by the reinforcement part 28 against the longitudinal direction X.

The firm connection of the first edge portion 281 with the associated leg 31 of the guide rail 3 can be accomplished by means of welding with a butt contact of the edge portion 281 with the inside of the leg 31. It is, however, also conceivable that the edge portion 281 is positively inserted into a corresponding cutout on the leg 31 and via this plug connection is welded to the leg 31.

The holding bracket 21 in turn is connected with the base 30 of the guide rail 3 via the fastening points 210, 211, for example by means of screws or rivets.

FIGS. 14*a*, 14*b*, 14*c* and 15*a*, 15*b* show a further exemplary embodiment of a reinforcement part 24\* arranged on a holding bracket 21. In this case, the reinforcement part 24\* is formed by two lateral legs 240\* extending along the longitudinal direction X (see FIG. 1), which are integrally formed with the flange 216 (which together with the flange 215 serves for fastening the holding bracket 21 to the guide rail 3 (see FIG. 1)). The legs 240\* extend parallel to each other and vertical to the plane of extension of the flange 216 and face the leg 212 of the holding bracket 21 with supporting portions 241\*, but are not directly firmly connected with the leg 212.

In a normal operating condition, the legs 240\* of the reinforcement part 24\* can be spaced from the leg 212 of the holding bracket 21 and thus in normal operation be not directly in contact with the leg 212. Only with a load acting on the holding bracket 21 in a direction which leads to a deformation of the holding bracket 21 and a resulting approach of the leg 240\* with the supporting portions 241\* to the leg 212 of the holding bracket 21, do the legs 240\* of the reinforcement part 24\* get in contact with the leg 212 of the holding bracket 21 and thus support the leg 212, so that with a load directed in this direction the holding bracket 21 is stiffened.

Figure 16A:
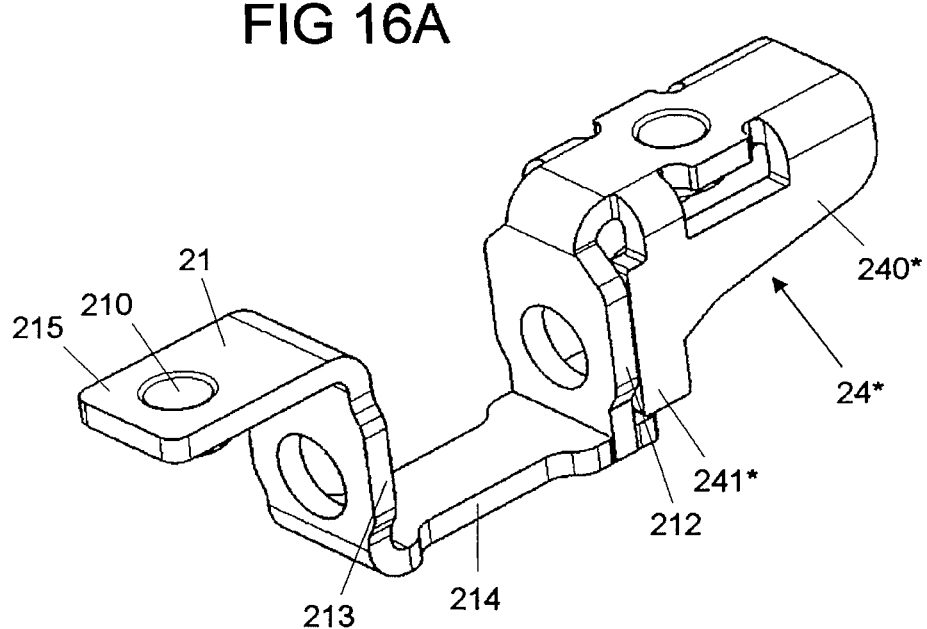
FIG. 16a shows a perspective view of a modified exemplary embodiment of a holding bracket.
Figure 16B:
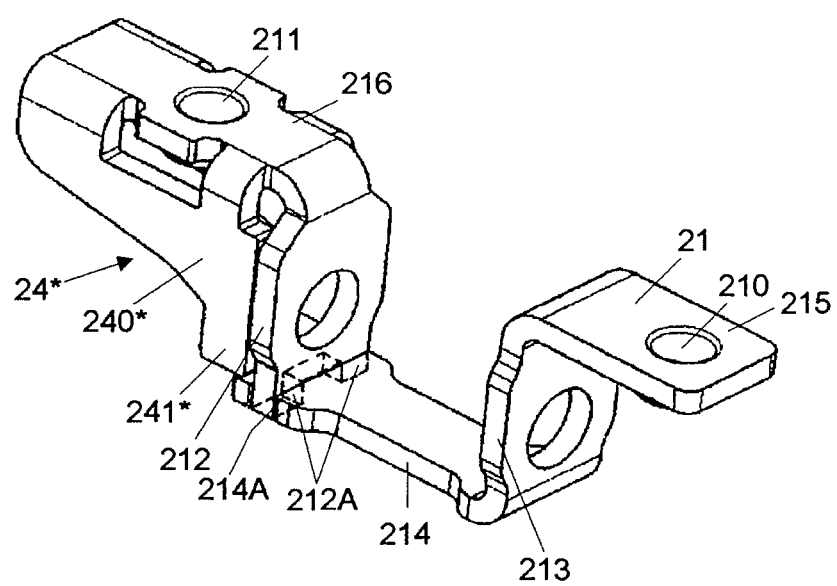

In a modified embodiment as shown in FIGS. 16*a* and 16*b* the holding bracket 21 is formed in two parts, in that the holding bracket 21 is formed by a first part (formed by the flange 215, the leg 213 and the base 214) and a second part (formed by the flange 216, the reinforcement part 24\* integrally formed therewith, and the leg 212). The leg 212 of the holding bracket 21 is connected with the base 214 of the holding bracket 21, in that pin-like protrusions 212A of the leg 212 engage into corresponding cutouts 214A of the base 214 and the leg 212 is welded to the base 214.

The welding seams provided for this purpose can be mounted on the pin-like protrusions 212A, or fillet welds can be provided between the base 214 and the leg 212 of the holding bracket 21 on both sides of the leg 212 on the side of the base 214 facing upwards.

In an exemplary embodiment shown in FIGS. 17*a* to 17*d*, a reinforcement part 28' is formed plate-shaped and rests flat against the lateral leg 31 of the guide rail 3. The reinforcement part 28' is firmly connected with the lateral leg 31, for example welded or screwed to the lateral leg 31.

Figure 17A:
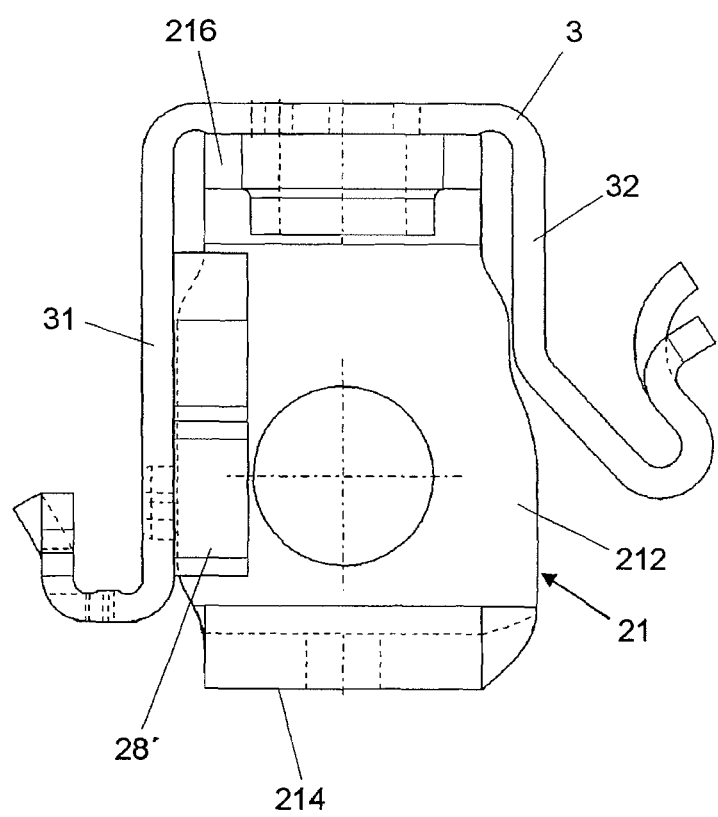
FIG. 17a shows a view of a further exemplary embodiment of a holding bracket arranged on a guide rail with a plate-shaped reinforcement part arranged on a leg of the guide rail, as seen in longitudinal direction into the guide rail.
Figure 17D:
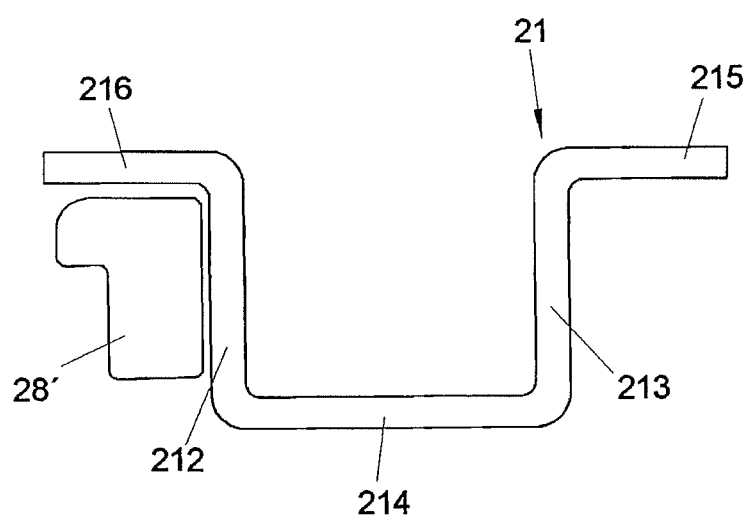
FIG. 17d shows a schematic side view of the holding bracket in its positional relation to the reinforcement part.

As can be taken from the front view of FIG. 17*a* and the schematic side view of FIG. 17*d* (which shows the positional relation between the holding bracket 21 and the reinforcement part 28'), the reinforcement part 28' is arranged on the inside of the leg 31 of the guide rail 3 and supportingly associated to the leg 212 of the holding bracket 21. In a normal operating condition, the reinforcement part 28' can be spaced from the leg 212 and thus not be in contact with the leg 212. Only with a correspondingly directed load and a deformation of the holding bracket 21 does the leg 212 get in contact with the reinforcement part 28' and thus is supported, so that a further deformation of the holding bracket 21 is not possible and as compared to a load force directed in this direction the holding bracket 21 is stiffened against an excessive deformation.

Figure 18A:
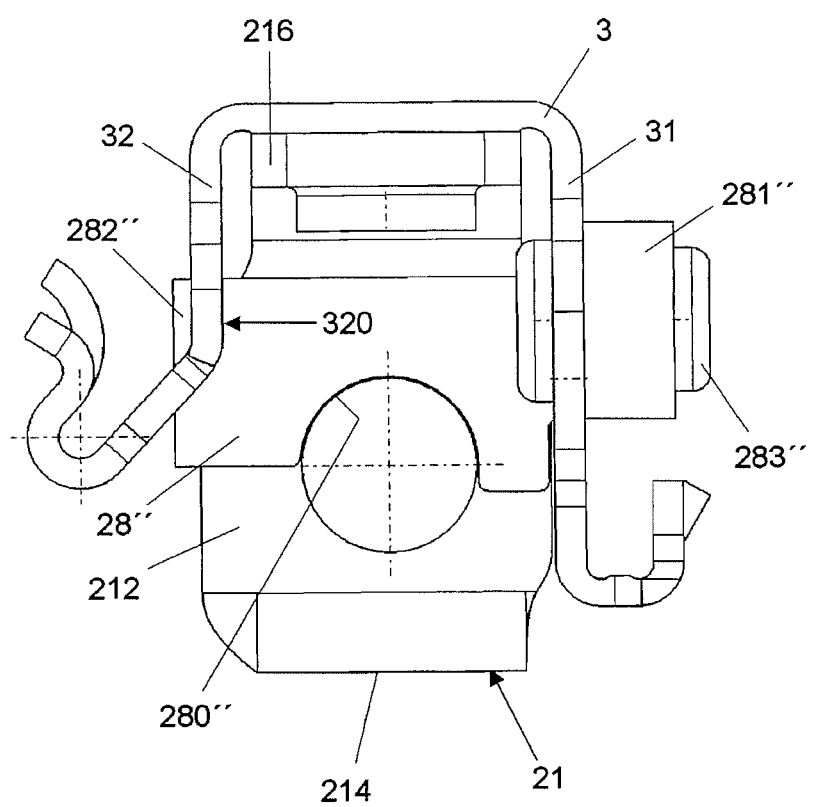
FIG. 18a shows a view of a further exemplary embodiment of a plate-shaped reinforcement part arranged on a guide rail for unilaterally supporting a holding bracket, as seen in longitudinal direction into the guide rail.

In a further exemplary embodiment shown in FIGS. 18*a* to 18*c*, a reinforcement part 28" is provided, which in a plate-shaped manner extends transversely in the interior space of the guide rail 3 formed between the legs 31, 32 of the guide rail 3. As can be taken in particular from FIGS. 18*b* and 18*c*, the reinforcement part 28" reaches through the leg 31 of the guide rail 3 on a cutout 310 and with a fastening portion 281" rests against the outside of the leg 31 and is firmly connected with the leg via a screw connection 283".

It is also conceivable here to provide a welded connection instead of the screw connection 283".

At one end, which is located opposite the end of the reinforcement part 28" carrying the fastening portion 281", the reinforcement part 28" includes an engagement portion 282" which lies in a cutout 320 of the leg 32 of the guide rail 3 with a clearance. In a normal operating condition, as already explained above with reference to the exemplary embodiment of FIGS. 11 to 13, the engagement portion 282" is not in contact with the leg 32. Only with a load acting in case of a crash and a resulting deformation of the holding bracket 21 and a support of the holding bracket 21 via the reinforcement part 28" does the engagement portion 282" get in contact with the border surrounding the cutout 320 on the leg 32, so that beside the attachment by the fastening portion 281" the reinforcement part 28" is supported on the border of the cutout 320 by contact of the engagement portion 282".

As can be taken from FIG. 18a, the reinforcement part 28" includes an approximately semicircular cutout 280", which is formed for a passage of the spindle 1 (see FIG. 1).

For assembly, the reinforcement part 28" is put from the outside of the leg 31 through the cutout 320 into the interior space of the guide rail 3 and connected with the leg 31 via the fastening portion 281".

As for example described above with reference to the exemplary embodiment of FIGS. 11 to 13, the reinforcement part 28" also can be spaced from the leg 212 of the holding bracket 21 in a normal operating condition, so that only with a correspondingly directed load the leg 212 supportingly gets in contact with the reinforcement part 28".

In a further exemplary embodiment shown in FIGS. 19a, 19b, 19c and 20a, 20b a reinforcement part 24 is formed by two legs 240 in the form of supporting sheets arranged on the flange 216 of the holding bracket 21. These legs 240 are welded to the holding bracket 21, in that for example for each leg 240 a first welding seam S1 is disposed between the leg 240 and the flange 216 and a second welding seam S2 is disposed between the leg 240 and the leg 212 of the holding bracket 21.

To achieve an additional reinforcement, a reinforcing bracket 29 additionally is provided, which is formed by a leg 290 and a flange 291 extending at right angles thereto.

The additional reinforcing bracket 29 is arranged on the holding bracket 21 such that the leg 290 of the reinforcing bracket 29 protrudes into the space for accommodating the adjusting gear unit 2 formed between the legs 212, 213 of the holding bracket 21. The leg 290 of the reinforcing bracket 29 therefore is arranged relative to the leg 212 of the holding bracket 21 such that the leg 212 of the holding bracket 21 is enclosed between the leg 290 of the reinforcing bracket 29 on the one hand and the legs 240 of the reinforcement part 24 on the other hand and thus a kind of sandwich construction is achieved.

By using the additional reinforcing bracket 29, the legs 240 of the reinforcement part 24 can be formed as comparatively thin sheets.

The reinforcing bracket 29 has a cutout 292 on its flange 291, through which a fastening means can reach for fastening the holding bracket 21 to the guide rail 3 via the flange 216. For fastening the reinforcing bracket 29 to the holding bracket 21, a welding seam S3 additionally can be provided between the leg 290 of the reinforcing bracket 29 and the leg 212 of the holding bracket 21.

Figure 19A:
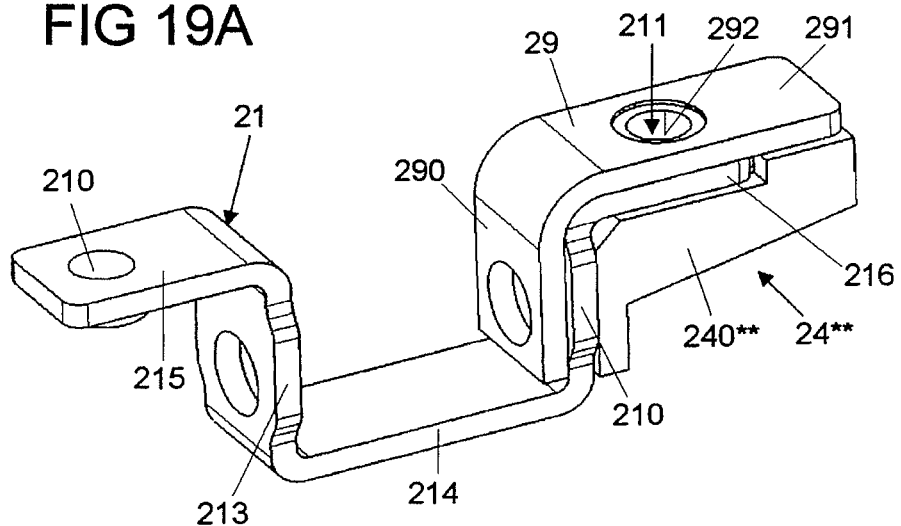
FIG. 19a shows a perspective view of an exemplary embodiment of a holding bracket with a reinforcement part arranged thereon as well as an additional reinforcing bracket.
Figure 19B:
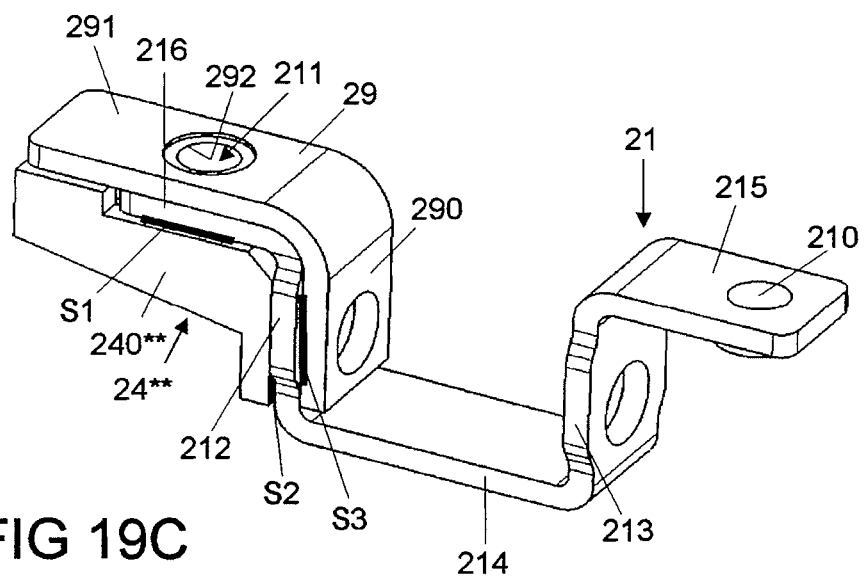
Figure 19C:
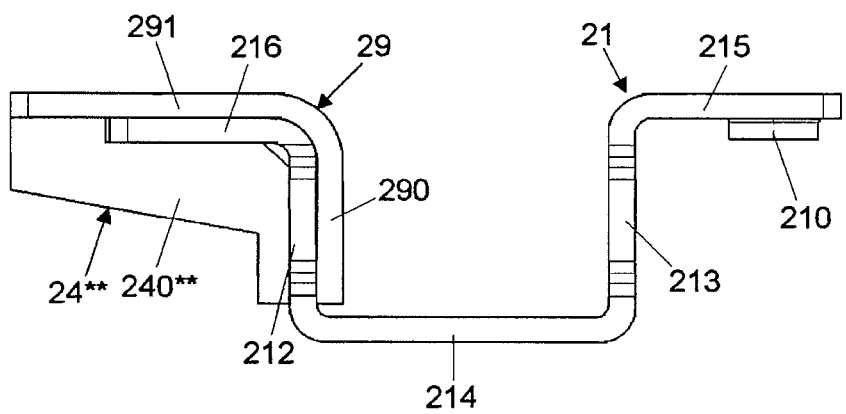
FIG. 19c shows a side view of the arrangement of FIGS. 19a and 19b.
Figure 20A:
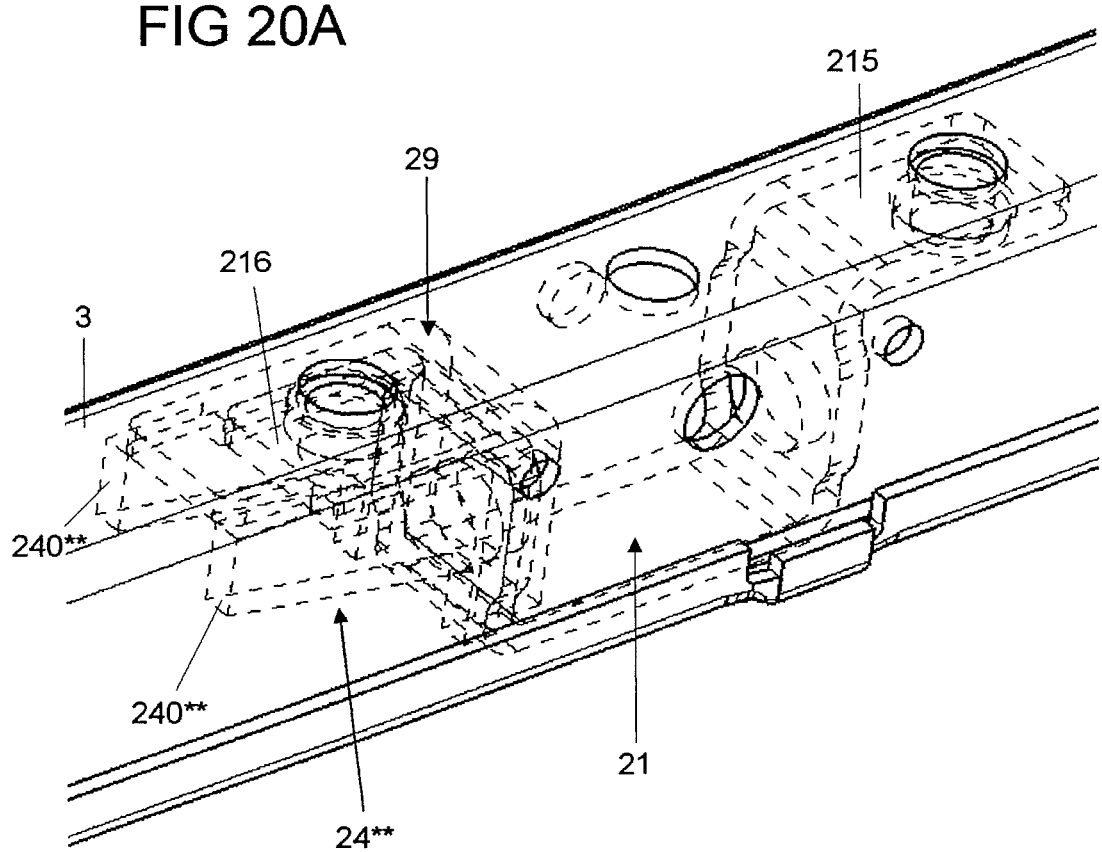
FIG. 20a shows a perspective view of the arrangement of FIGS. 19a to 19c on a guide rail
Figure 20B:
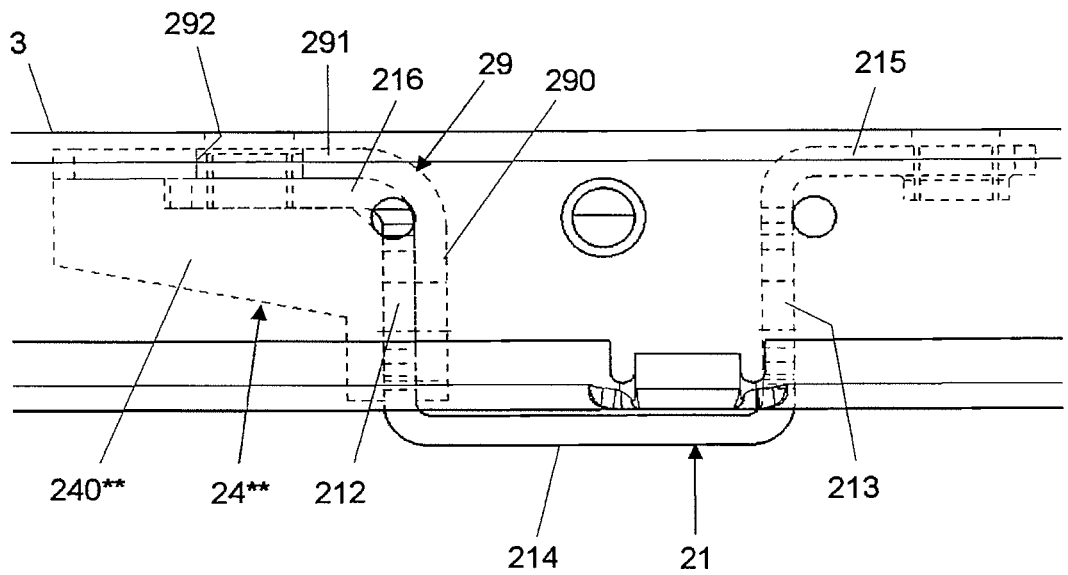

As can be taken from the side view of FIG. 19c, the flange 291 of the reinforcing bracket 29 and the flange 215 of the holding bracket 21 extend in the same plane along the longitudinal direction X, so that the holding bracket 21 with the reinforcing bracket 29 arranged thereon can be mounted on the guide rail 3.

The idea underlying the invention is not limited to the exemplary embodiments described above, but rather can also be realized in principle in completely different embodiments. In particular, the use of an adjusting means as described above is not limited to vehicle seats and to a longitudinal setting, but can also be used in principle for adjusting other vehicle parts relative to each other, for example for seat height adjustment, for adjusting a backrest or a headrest, for a window lifter or for sliding roofs.

The invention claimed is:

1. An adjusting device for adjusting two vehicle parts relative to each other, in particular for the longitudinal setting of a vehicle seat, the adjusting device comprising:
an adjusting gear unit arranged on a first vehicle part,
a spindle arranged on a second vehicle part, the spindle extending along a longitudinal direction and being in engagement with the adjusting gear unit, wherein the adjusting gear unit is movable along the spindle for adjusting the first vehicle part relative to the second vehicle part, and
a reinforcement part which supports the adjusting gear unit with respect to the first vehicle part in the longitudinal direction of the spindle such that, due to the reinforcement part, the adjusting gear unit is supported with respect to the first vehicle part with a first rigidity when forces are introduced in the longitudinal direction from the first vehicle part into the adjusting gear unit and with a second rigidity smaller than the first rigidity when forces are introduced in a direction opposite to the longitudinal direction,
wherein a connection of the adjusting gear unit to the first vehicle part permits, due to the supporting effect of the reinforcement part, a first offset between the first vehicle part and the second vehicle part by at most a first distance when forces are introduced in the longitudinal direction from the first vehicle part into the adjusting gear unit, and permits a second offset between the first vehicle part and the second vehicle part by a second distance larger than the first distance when forces are introduced in a direction opposite to the longitudinal direction from the first vehicle part into the adjusting gear unit.

2. The adjusting device according to claim 1, wherein the reinforcement part supports the adjusting gear unit with respect to forces introduced in the longitudinal direction from the first vehicle part into the adjusting gear unit, but not with respect to forces introduced in the direction opposite the longitudinal direction.

3. The adjusting device according to claim 1, wherein the longitudinal direction of the spindle corresponds to a longitudinal vehicle direction directed in a direction of forward travel of a vehicle, wherein the reinforcement part is arranged, when viewed in the longitudinal direction behind the adjusting gear unit for absorbing forces introduced in a frontal crash.

4. The adjusting device according to claim 3, further comprising a further reinforcement part which is arranged, when viewed in the longitudinal direction, in front of the adjusting gear unit for absorbing forces introduced in a rear-end crash.

5. An adjusting device for adjusting two vehicle parts relative to each other, in particular for the longitudinal setting of a vehicle seat, the adjusting device comprising:
an adjusting gear unit arranged on a first vehicle part,
a spindle arranged on a second vehicle part, which extends in longitudinal direction, is in engagement with the adjusting gear unit and along which the adjusting gear unit is movable for adjusting the first vehicle part relative to the second vehicle part, and
a reinforcement part which supports the adjusting gear unit with respect to the first vehicle part in the longitudinal direction of the spindle such that due to the reinforcement part with forces introduced in the longitudinal direction from the first vehicle part into the adjusting gear unit the adjusting gear unit is supported with respect to the first vehicle part with a higher rigidity than with forces introduced against the longitudinal direction,
wherein the reinforcement part includes supporting ribs for absorbing forces introduced in the longitudinal direction of the spindle.

6. The adjusting device according to claim 5, wherein the reinforcement part has a U-shape in cross-section transversely to the longitudinal direction of the spindle, whose legs form the supporting ribs.

7. The adjusting device according to claim 5, wherein the adjusting gear unit protrudes from the first vehicle part in a vertical direction transversely to the longitudinal direction of the spindle and the supporting ribs extend in planes defined by the vertical direction and the longitudinal direction.

8. The adjusting device according to claim 1, wherein the reinforcement part is formed as a cube-shaped block arranged on the first vehicle part, which is formed for the substantially deformation-free absorption of forces introduced in the longitudinal direction of the spindle.

9. The adjusting device according to claim 1, wherein the adjusting gear unit is attached to the first vehicle part via a transmission housing of the adjusting gear unit, wherein the reinforcement part is formed as an additional part and connected with the transmission housing of the adjusting gear unit.

10. The adjusting device according to claim 1, wherein the adjusting gear unit is attached to the first vehicle part via a transmission housing of the adjusting gear unit and the reinforcement part is integrally formed with the transmission housing.

11. The adjusting device according to claim 1, wherein the adjusting gear unit is attached to the first vehicle part via a holding bracket which partly encloses a transmission housing of the adjusting gear unit, wherein the reinforcement part is arranged on the holding bracket.

12. The adjusting device according to claim 11, wherein the holding bracket is attached to the first vehicle part via a flange and the reinforcement part is formed by legs arranged on the flange.

13. The adjusting device according to claim 11, wherein the holding bracket includes two legs and a base connecting the legs with each other, wherein the adjusting gear unit is arranged between the legs of the holding bracket and an additional reinforcing bracket, which includes a leg and a flange extending at right angles to this leg, is arranged on a first one of the legs of the holding bracket such that the first leg of the holding bracket is arranged between the leg of the reinforcing bracket and the reinforcement part.

14. The adjusting device according to claim 1, wherein the adjusting gear unit is attached to the first vehicle part via a holding bracket which partly encloses a transmission housing of the adjusting gear unit and the reinforcement part is arranged on the first vehicle part and firmly connected with the first vehicle part.

15. The adjusting device according to claim 14, wherein the first vehicle part is formed as guide rail extending along the longitudinal direction, which in cross-section vertical to the longitudinal direction has a substantially U-shaped cross-section and is formed by a base and lateral legs connected with each other via the base, and the reinforcement part is formed as plate extending transversely to the longitudinal direction.

16. The adjusting device according to claim 15, wherein with at least one edge portion the reinforcement part is connected with at least one of the legs of the guide rail.

17. The adjusting device according to claim 16, wherein with a first edge portion the reinforcement part is firmly connected with the one of the legs of the guide rail and with another, second edge portion engages into a cutout of the other one of the legs with a clearance.

18. The adjusting device according to claim 14, wherein the first vehicle part is formed as a guide rail extending along the longitudinal direction, which in cross-section vertical to the longitudinal direction has a substantially U-shaped cross-section and is formed by a base and lateral legs connected with each other via the base and the reinforcement part is formed as a plate extending along the longitudinal direction and attached to one of the lateral legs of the guide rail.

19. The adjusting device according to claim 1, wherein the adjusting gear unit is attached to the first vehicle part via a holding bracket which partly encloses a transmission housing of the adjusting gear unit, wherein as seen along the longitudinal direction the reinforcement part is arranged on the first vehicle part with a distance to a leg of the holding bracket extending transversely to the longitudinal direction and arranged on a side of the transmission housing facing the reinforcement part.

20. An adjusting device for adjusting two vehicle parts relative to each other, in particular for the longitudinal setting of a vehicle seat, the adjusting device comprising:
an adjusting gear unit arranged on a first vehicle part,
a spindle arranged on a second vehicle part, which extends in longitudinal direction, is in engagement with the adjusting gear unit and along which the adjusting gear unit is movable for adjusting the first vehicle part relative to the second vehicle part, and
a reinforcement part which supports the adjusting gear unit with respect to the first vehicle part in the longitudinal direction of the spindle such that due to the reinforcement part with forces introduced in the longitudinal direction from the first vehicle part into the adjusting gear unit the adjusting gear unit is supported with respect to the first vehicle part with a higher rigidity than with forces introduced against the longitudinal direction,
wherein a connection of the adjusting gear unit to the first vehicle part with forces introduced in the longitudinal direction from the first vehicle part into the adjusting gear unit, due to the supporting effect of the reinforcement part, permits an offset between the first vehicle part and the second vehicle part of less than 10 mm, and
with forces introduced against the longitudinal direction from the first vehicle part into the adjusting gear unit permits an offset between the first vehicle part and the second vehicle part between 20 mm and 40 mm, preferably about 30 mm.

* * * * *